(12) United States Patent
Rico Alvarino et al.

(10) Patent No.: US 10,575,303 B2
(45) Date of Patent: Feb. 25, 2020

(54) UPLINK DESIGN FOR NARROWBAND LTE (NB-LTE)

(71) Applicant: QUALCOMM Incorporated, San Diego, CA (US)

(72) Inventors: Alberto Rico Alvarino, San Diego, CA (US); Seyed Ali Akbar Fakoorian, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 15/209,505

(22) Filed: Jul. 13, 2016

(65) Prior Publication Data
US 2017/0070994 A1 Mar. 9, 2017

Related U.S. Application Data

(60) Provisional application No. 62/232,634, filed on Sep. 25, 2015, provisional application No. 62/214,165, filed on Sep. 3, 2015.

(51) Int. Cl.
*H04W 72/04* (2009.01)
*H04W 4/70* (2018.01)
*H04W 88/08* (2009.01)
*H04W 88/02* (2009.01)
*H04L 5/00* (2006.01)
*H04L 5/14* (2006.01)

(52) U.S. Cl.
CPC ....... *H04W 72/0453* (2013.01); *H04L 5/0048* (2013.01); *H04L 5/14* (2013.01);
(Continued)

(58) Field of Classification Search
CPC combination set(s) only.
See application file for complete search history.

(56) References Cited

U.S. PATENT DOCUMENTS

2010/0234040 A1* 9/2010 Palanki ............... H04L 5/0073
455/452.2
2015/0180622 A1 6/2015 Yoo et al.
(Continued)

FOREIGN PATENT DOCUMENTS

WO WO-2015003347 A1 * 1/2015 ............ H04W 16/06
WO WO-2017005295 A1 * 1/2017 ........... H04L 5/0028

OTHER PUBLICATIONS

CATT: "Discussion on UE-specific SRS Configuration," 3GPP Draft; R1-123219, 3rd Generation Partnership Project (3GPP), Mobile Competence Centre ; 650, Route Des Lucioles ; F-06921 Sophia Antipolis Cedex ; France vol. RAN WG1, No. Qingdao, China; Aug. 13, 2012-Aug. 17, 2012 Aug. 5, 2012 (Aug. 5, 2012), XP050661111, Retrieved from the Internet: URL:http://www.3gpp.org/ftp/tsg_ran/WG1_RL 1/TSGR1_70/Docs/ [retrieved on Aug. 5, 2012], 3 pages.
(Continued)

*Primary Examiner* — Yee F Lam
(74) *Attorney, Agent, or Firm* — Patterson & Sheridan, LLP

(57) ABSTRACT

Aspects of the present disclosure provide techniques for wireless communications by a base station. An example method generally includes allocating uplink resources to one or more first type of user equipments (UEs) that communicate with the BS on a first frequency band that is narrower than a second frequency band used to communicate with a second type of UE, wherein the uplink resources may be allocated with a same or different symbol duration and same or different time granularity as uplink resources allocated to the second type of UE and with single subcarriers allocated to the first type of UEs, and receiving uplink transmissions from the first type of UE on the allocated resources.

26 Claims, 22 Drawing Sheets

| Symbol Index (SF) | 1 | | 2 | | |
|---|---|---|---|---|---|
| Content | CP (l) | D | CP (s) | D | GP |
| Sample Size | 44 | 896 | 44 | 896 | 40 |

1530

(52) U.S. Cl.
CPC ......... *H04W 4/70* (2018.02); *H04W 72/0466* (2013.01); *H04W 88/02* (2013.01); *H04W 88/08* (2013.01)

(56) References Cited

U.S. PATENT DOCUMENTS

| | | | | |
|---|---|---|---|---|
| 2016/0157212 | A1* | 6/2016 | Zhang | H04W 16/06 370/329 |
| 2016/0241323 | A1* | 8/2016 | Ko | H04B 7/0691 |
| 2018/0206253 | A1* | 7/2018 | Yun | H04L 5/0062 |
| 2018/0206271 | A1* | 7/2018 | Chatterjee | H04L 5/0053 |

OTHER PUBLICATIONS

Ericsson LM., et al., "Narrowband LTE—Concept Description," 3GPP DRAFT; R1-154659, 3rd Generation Partnership Project (3GPP), Mobile Competence Centre ; 650, Route Des Lucioles ; F-06921 Sophia-Antipolis Cedex ; France vol. RAN WG1, No. Beijing, China; Aug. 24, 2015-Aug. 28, 2015 Aug. 23, 2015 (Aug. 23, 2015), XP051001893, Retrieved from the Internet: URL:http://www.3gpp.org/ftp/Meetings_3GPP_SYNC/RAN1/Docs/ [retrieved on Aug. 23, 2015], 9 pages.

Fujitsu: "TDD Frame Structure with Mixed Numerology," 3GPP Draft; R1-164331 TDD Frame Structure With Mixed Numerology, 3rd Generation Partnership Project (3GPP), Mobile Competence Centre ; 650, Route Des Lucioles ; F-06921 Sophia-Antipolis Cedex ; France vol. RAN WG1, No. Nanjing, China; May 23, 2016-May 27, 2016 May 13, 2016 (May 13, 2016), XP051090160, Retrieved from the Internet: URL:http://www.3gpp.org/ftp/tsg_ran/WG1_RL1/TSGR1 85/Docs/ [retrieved on May 13, 2016], 5 pages.

International Search Report and Written Opinion—PCT/US2016/042233—ISA/EPO—dated Sep. 29, 2016.

* cited by examiner

FIG. 15A (1510)

| Symbol Index (Slot) | 1 | | 2 | | 3 | | 4 | | 5 | | 6 | | 7 | |
|---|---|---|---|---|---|---|---|---|---|---|---|---|---|---|
| Content | CP (l) | D | CP (s) | D | CP (s) | D | CP (s) | D | CP (s) | D | CP (s) | D | CP (s) | D |
| Sample Size | 10 | 128 | 9 | 128 | 9 | 128 | 9 | 128 | 9 | 128 | 9 | 128 | 9 | 128 |

FIG. 15B (1520)

| Symbol Index (SF) | 1 | | 2 | |
|---|---|---|---|---|
| Content | CP (l) | D | CP (s) | D |
| Sample Size | 64 | 896 | 64 | 896 |

FIG. 15C (1530)

| Symbol Index (SF) | 1 | | 2 | | |
|---|---|---|---|---|---|
| Content | CP (l) | D | CP (s) | D | GP |
| Sample Size | 44 | 896 | 44 | 896 | 40 |

1610

| Symbol Index (SF) | 1 | | 2 | |
|---|---|---|---|---|
| Content | CP (l) | D | CP (s) | D |
| Sample Size | 192 | 768 | 192 | 768 |

| Symbol Index (SF) | 1 | | | 2 | | |
|---|---|---|---|---|---|---|
| Content | CP (l) | D | GP | CP (s) | D | GP |
| Sample Size | 106 | 768 | 86 | 106 | 768 | 86 |

| Symbol Index (SF) | 1 | | 2 | | |
|---|---|---|---|---|---|
| Content | CP (l) | D | CP (s) | D | GP (SRS) |
| Sample Size | 96 | 768 | 96 | 768 | <u>192</u> |

|  | TDD | FDD |
|---|---|---|
| Normal CP | Scheme 2 | Scheme 1 |
| Extended CP | Scheme 3 | Scheme 3 |

*FIG. 19*

UPLINK DESIGN FOR NARROWBAND LTE (NB-LTE)

CROSS-REFERENCE TO RELATED APPLICATIONS

This application claims benefit of U.S. Provisional Patent Application Ser. No. 62/214,165, filed Sep. 3, 2015 and entitled "Uplink Design for Narrowband LTE (NB-LTE)" and U.S. Provisional Patent Application Ser. No. 62/232,634, filed Sep. 25, 2015 and entitled "Uplink Design for Narrowband LTE," both of which are assigned to the assignee hereof and are incorporated herein in their entirety by reference.

BACKGROUND

I. Field

Certain aspects of the present disclosure generally relate to wireless communications and, more particularly, to uplink resources used by UEs operating on a narrow band relative to other UEs.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, etc. Some UEs may be considered machine-type communication (MTC) UEs, which may include remote devices, such as sensors, meters, location tags, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

Certain aspects of the present disclosure provide a method for wireless communications by a base station (BS). The method generally includes allocating uplink resources to one or more first type of user equipments (UEs) that communicate with the BS on a first frequency band that is narrower than a second frequency band used to communicate with a second type of UE, wherein the uplink resources are allocated in a narrowband subframe structure having a symbol duration determined, at least in part, on characteristics of communications between the BS and the second type of UE using the second frequency band, and receiving uplink transmissions from the first type of UE on the allocated resources.

Certain aspects of the present disclosure provide an apparatus for wireless communications by a base station. The apparatus generally includes a processing system configured to allocate uplink resources to one or more first type of user equipments (UEs) that communicate with the BS on a first frequency band that is narrower than a second frequency band used to communicate with a second type of UE, wherein the uplink resources are allocated in a narrowband subframe structure having a symbol duration determined, at least in part, on characteristics of communications between the BS and the second type of UE using the second frequency band, and a receiver configured to receive uplink transmissions from the first type of UE on the allocated resources.

Certain aspects of the present disclosure provide an apparatus for wireless communications by a base station. The apparatus generally includes means for allocating uplink resources to one or more first type of user equipments (UEs) that communicate with the BS on a first frequency band that is narrower than a second frequency band used to communicate with a second type of UE, wherein the uplink resources are allocated in a narrowband subframe structure having a symbol duration determined, at least in part, on characteristics of communications between the BS and the second type of UE using the second frequency band, and means for receiving uplink transmissions from the first type of UE on the allocated resources.

Certain aspects of the present disclosure provide a computer readable medium for wireless communications by a base station. The computer readable medium generally has instructions stored thereon, the instructions executable by one or more processors for allocating uplink resources to one or more first type of user equipments (UEs) that communicate with the BS on a first frequency band that is narrower than a second frequency band used to communicate with a second type of UE, wherein the uplink resources are allocated in a narrowband subframe structure having a symbol duration determined, at least in part, on characteristics of communications between the BS and the second type of UE using the second frequency band, and receiving uplink transmissions from the first type of UE on the allocated resources.

Certain aspects of the present disclosure provide a method for wireless communications by a user equipment (UE). The method generally includes receiving, from a base station (BS), an allocation of uplink resources for communications with the base station on a first frequency band that is narrower than a second frequency band used by a second type of UE to communicate with the base station, wherein the uplink resources are allocated in a narrowband subframe structure having a symbol duration determined, at least in part, on characteristics of communications between the BS and the second type of UE using the second frequency band, and performing uplink transmissions on the allocated resources.

Certain aspects of the present disclosure provide an apparatus for wireless communications by a user equipment (UE). The apparatus generally includes a receiver configured to receive, from a base station (BS), an allocation of uplink resources for communications with the base station on a first frequency band that is narrower than a second frequency band used by a second type of UE to communicate with the base station, wherein the uplink resources are allocated in a narrowband subframe structure having a symbol duration determined, at least in part, on characteristics of communications between the BS and the second type of UE using the second frequency band, and a transmitter configured to perform uplink transmissions on the allocated resources.

Certain aspects of the present disclosure provide an apparatus for wireless communications by a user equipment (UE). The apparatus generally includes means for receiving an allocation of uplink resources for communications with the base station on a first frequency band that is narrower than a second frequency band used by a second type of UE to communicate with the base station, wherein the uplink resources are allocated in a narrowband subframe structure having a symbol duration determined, at least in part, on characteristics of communications between the BS and the second type of UE using the second frequency band, and means for performing uplink transmissions on the allocated resources.

Certain aspects of the present disclosure provide a computer readable medium for wireless communications by a user equipment (UE). The computer readable medium generally includes instructions stored thereon, the instructions being executable by one or more processors for receiving, from a base station (BS), an allocation of uplink resources for communications with the base station on a first frequency band that is narrower than a second frequency band used by a second type of UE to communicate with the base station, wherein the uplink resources are allocated in a narrowband subframe structure having a symbol duration determined, at least in part, on characteristics of communications between the BS and the second type of UE using the second frequency band, and performing uplink transmissions on the allocated resources.

Certain aspects of the present disclosure provide a method for wireless communications by a base station (BS). The method generally includes allocating uplink resources to one or more first type of user equipments (UEs) that communicate with the BS on a first frequency band that is narrower than a second frequency band used to communicate with a second type of UE, wherein the uplink resources are allocated with a same symbol duration and same time granularity as uplink resources allocated to the second type of UE and with single subcarriers allocated to the first type of UEs, and receiving uplink transmissions from the first type of UE on the allocated resources.

Certain aspects of the present disclosure provide an apparatus for wireless communications by a base station (BS). The apparatus generally includes a processing system configured to allocate uplink resources to one or more first type of user equipments (UEs) that communicate with the BS on a first frequency band that is narrower than a second frequency band used to communicate with a second type of UE, wherein the uplink resources are allocated with a same symbol duration and same time granularity as uplink resources allocated to the second type of UE and with single subcarriers allocated to the first type of UEs, and a receiver configured to receive uplink transmissions from the first type of UE on the allocated resources.

Certain aspects of the present disclosure provide an apparatus for wireless communications by a base station (BS). The apparatus generally includes means for allocating uplink resources to one or more first type of user equipments (UEs) that communicate with the BS on a first frequency band that is narrower than a second frequency band used to communicate with a second type of UE, wherein the uplink resources are allocated with a same symbol duration and same time granularity as uplink resources allocated to the second type of UE and with single subcarriers allocated to the first type of UEs, and means for receiving uplink transmissions from the first type of UE on the allocated resources.

Certain aspects of the present disclosure provide a computer readable medium for wireless communications by a base station (BS). The computer readable medium generally includes instructions stored thereon, the instructions being executable by one or more processors for allocating uplink resources to one or more first type of user equipments (UEs) that communicate with the BS on a first frequency band that is narrower than a second frequency band used to communicate with a second type of UE, wherein the uplink resources are allocated with a same symbol duration and same time granularity as uplink resources allocated to the second type of UE and with single subcarriers allocated to the first type of UEs, and receiving uplink transmissions from the first type of UE on the allocated resources.

Certain aspects of the present disclosure provide a method for wireless communications by a first type of user equipment (UE). The method generally includes receiving, from a base station, an uplink resource allocation for communications with the base station on a first frequency band that is narrower than a second frequency band used by a second type of UE to communicate with the base station, wherein the allocated resources have a same symbol duration and same time granularity as uplink resources allocated to the second type of UE and with single subcarriers allocated to the first type of UEs, and performing uplink transmissions on the allocated resources.

Certain aspects of the present disclosure provide an apparatus for wireless communications by a first type of user equipment (UE). The apparatus generally includes a receiver configured to receive, from a base station, an uplink resource allocation for communications with the base station on a first frequency band that is narrower than a second frequency band used by a second type of UE to communicate with the base station, wherein the allocated resources have a same symbol duration and same time granularity as uplink resources allocated to the second type of UE and with single subcarriers allocated to the first type of UEs, and a transmitter configured to perform uplink transmissions on the allocated resources.

Certain aspects of the present disclosure provide an apparatus for wireless communications by a first type of user equipment (UE). The apparatus generally includes means for receiving, from a base station, an uplink resource allocation for communications with the base station on a first frequency band that is narrower than a second frequency band used by a second type of UE to communicate with the base station, wherein the allocated resources have a same symbol duration and same time granularity as uplink resources allocated to the second type of UE and with single subcarriers allocated to the first type of UEs, and means for performing uplink transmissions on the allocated resources.

Certain aspects of the present disclosure provide a computer readable medium for wireless communications by a first type of user equipment (UE). The computer readable medium generally includes instructions stored thereon, the instructions being executable by one or more processors for receiving, from a base station, an uplink resource allocation for communications with the base station on a first frequency band that is narrower than a second frequency band used by a second type of UE to communicate with the base station, wherein the allocated resources have a same symbol duration and same time granularity as uplink resources allocated to the second type of UE and with single subcarriers allocated to the first type of UEs, and performing uplink transmissions on the allocated resources.

Certain aspects of the present disclosure provide a method for wireless communications by a base station (BS). The method generally includes allocating uplink resources to one or more first type of user equipments (UEs) that communicate with the BS on a first frequency band that is narrower than a second frequency band used to communicate with a second type of UE, wherein the uplink resources are allocated in a narrowband subframe structure with an increased symbol duration and narrower subcarrier spacing relative to uplink resources allocated to the second type of UE and wherein the narrowband subframe structure comprises at least two time slots each have a same duration as a subframe structure used to communicate with the second type of UE, and receiving uplink transmissions from the first type of UE on the allocated resources.

Certain aspects of the present disclosure provide an apparatus for wireless communications by a base station (BS). The apparatus generally includes a processing system configured to allocate uplink resources to one or more first type of user equipments (UEs) that communicate with the BS on a first frequency band that is narrower than a second frequency band used to communicate with a second type of UE, wherein the uplink resources are allocated in a narrowband subframe structure with an increased symbol duration and narrower subcarrier spacing relative to uplink resources allocated to the second type of UE and wherein the narrowband subframe structure comprises at least two time slots each have a same duration as a subframe structure used to communicate with the second type of UE, and a receiver configured to receive uplink transmissions from the first type of UE on the allocated resources.

Certain aspects of the present disclosure provide an apparatus for wireless communications by a base station (BS). The apparatus generally includes means for allocating uplink resources to one or more first type of user equipments (UEs) that communicate with the BS on a first frequency band that is narrower than a second frequency band used to communicate with a second type of UE, wherein the uplink resources are allocated in a narrowband subframe structure with an increased symbol duration and narrower subcarrier spacing relative to uplink resources allocated to the second type of UE and wherein the narrowband subframe structure comprises at least two time slots each have a same duration as a subframe structure used to communicate with the second type of UE, and means for receiving uplink transmissions from the first type of UE on the allocated resources.

Certain aspects of the present disclosure provide a computer readable medium for wireless communications by a base station (BS). The computer readable medium generally includes instructions stored thereon, the instructions being executable by one or more processors for allocating uplink resources to one or more first type of user equipments (UEs) that communicate with the BS on a first frequency band that is narrower than a second frequency band used to communicate with a second type of UE, wherein the uplink resources are allocated in a narrowband subframe structure with an increased symbol duration and narrower subcarrier spacing relative to uplink resources allocated to the second type of UE and wherein the narrowband subframe structure comprises at least two time slots each have a same duration as a subframe structure used to communicate with the second type of UE, and receiving uplink transmissions from the first type of UE on the allocated resources.

Certain aspects of the present disclosure provide a method for wireless communications by a first type of user equipment (UE). The method generally includes receiving, from a base station, an uplink resource allocation for communications with the base station on a first frequency band that is narrower than a second frequency band used by a second type of UE to communicate with the base station, wherein the uplink resources are allocated in a narrowband subframe structure with an increased symbol duration and narrower subcarrier spacing relative to uplink resources allocated to the second type of UE and wherein the narrowband subframe structure comprises at least two time slots, each having a same duration as a subframe structure used to communicate with the second type of UE, and performing uplink transmissions on the allocated resources.

Certain aspects of the present disclosure provide an apparatus for wireless communications by a first type of user equipment (UE). The apparatus generally includes a receiver configured to receive, from a base station, an uplink resource allocation for communications with the base station on a first frequency band that is narrower than a second frequency band used by a second type of UE to communicate with the base station, wherein the uplink resources are allocated in a narrowband subframe structure with an increased symbol duration and narrower subcarrier spacing relative to uplink resources allocated to the second type of UE and wherein the narrowband subframe structure comprises at least two time slots, each having a same duration as a subframe structure used to communicate with the second type of UE, and a transmitter configured to perform uplink transmissions on the allocated resources.

Certain aspects of the present disclosure provide an apparatus for wireless communications by a first type of user equipment (UE). The apparatus generally includes means for receiving, from a base station, an uplink resource allocation for communications with the base station on a first frequency band that is narrower than a second frequency band used by a second type of UE to communicate with the base station, wherein the uplink resources are allocated in a narrowband subframe structure with an increased symbol duration and narrower subcarrier spacing relative to uplink resources allocated to the second type of UE and wherein the narrowband subframe structure comprises at least two time slots, each having a same duration as a subframe structure used to communicate with the second type of UE, and means for performing uplink transmissions on the allocated resources.

Certain aspects of the present disclosure provide a computer readable medium for wireless communications by a first type of user equipment (UE). The computer readable medium generally includes instructions stored thereon, the instructions being executable by one or more processors for receiving, from a base station, an uplink resource allocation for communications with the base station on a first frequency band that is narrower than a second frequency band used by a second type of UE to communicate with the base station, wherein the uplink resources are allocated in a narrowband subframe structure with an increased symbol duration and narrower subcarrier spacing relative to uplink resources allocated to the second type of UE and wherein the narrowband subframe structure comprises at least two time slots, each having a same duration as a subframe structure used to communicate with the second type of UE, and performing uplink transmissions on the allocated resources.

Certain aspects of the present disclosure provide a method for wireless communications by a base station (BS). The method generally includes allocating uplink resources to one or more first type of user equipments (UEs) that communicate with the BS on a first frequency band that is narrower than a second frequency band used to communicate with a second type of UE, wherein the uplink resources are allocated in a narrowband subframe structure with an increased symbol duration relative to uplink resources allocated to the second type of UE and wherein the narrowband subframe structure comprises at least two symbols and has a same duration as a subframe structure used to communicate with the second type of UE, and receiving uplink transmissions from the first type of UE on the allocated resources.

Certain aspects of the present disclosure provide an apparatus for wireless communications by a base station (BS). The apparatus generally includes a processing system configured to allocate uplink resources to one or more first type of user equipments (UEs) that communicate with the BS on a first frequency band that is narrower than a second frequency band used to communicate with a second type of UE, wherein the uplink resources are allocated in a narrowband subframe structure with an increased symbol duration relative to uplink resources allocated to the second type of UE and wherein the narrowband subframe structure comprises at least two symbols and has a same duration as a subframe structure used to communicate with the second type of UE, and a receiver configured to receive uplink transmissions from the first type of UE on the allocated resources.

Certain aspects of the present disclosure provide an apparatus for wireless communications by a base station (BS). The apparatus generally includes means for allocating uplink resources to one or more first type of user equipments (UEs) that communicate with the BS on a first frequency band that is narrower than a second frequency band used to communicate with a second type of UE, wherein the uplink resources are allocated in a narrowband subframe structure with an increased symbol duration relative to uplink resources allocated to the second type of UE and wherein the narrowband subframe structure comprises at least two symbols and has a same duration as a subframe structure used to communicate with the second type of UE, and means for receiving uplink transmissions from the first type of UE on the allocated resources.

Certain aspects of the present disclosure provide a computer readable medium for wireless communications by a base station (BS). The computer readable medium generally includes instructions stored thereon, the instructions being executable by one or more processors for allocating uplink resources to one or more first type of user equipments (UEs) that communicate with the BS on a first frequency band that is narrower than a second frequency band used to communicate with a second type of UE, wherein the uplink resources are allocated in a narrowband subframe structure with an increased symbol duration relative to uplink resources allocated to the second type of UE and wherein the narrowband subframe structure comprises at least two symbols and has a same duration as a subframe structure used to communicate with the second type of UE, and receiving uplink transmissions from the first type of UE on the allocated resources.

Certain aspects of the present disclosure provide a method for wireless communications by a first type of user equipment (UE). The method generally includes receiving, from a base station, an allocation of uplink resources for communications with the base station on a first frequency band that is narrower than a second frequency band used by a second type of UE to communicate with the base station, wherein the uplink resources are allocated in a narrowband subframe structure with an increased symbol duration relative to uplink resources allocated to the second type of UE and wherein the narrowband subframe structure comprises at least two symbols and has a same duration as a subframe structure used to communicate with the second type of UE, and performing uplink transmissions on the allocated resources.

Certain aspects of the present disclosure provide an apparatus for wireless communications by a first type of user equipment (UE). The apparatus generally includes a receiver configured to receive, from a base station, an allocation of uplink resources for communications with the base station on a first frequency band that is narrower than a second frequency band used by a second type of UE to communicate with the base station, wherein the uplink resources are allocated in a narrowband subframe structure with an increased symbol duration relative to uplink resources allocated to the second type of UE and wherein the narrowband subframe structure comprises at least two symbols and has a same duration as a subframe structure used to communicate with the second type of UE, and a transmitter configured to perform uplink transmissions on the allocated resources.

Certain aspects of the present disclosure provide an apparatus for wireless communications by a first type of user equipment (UE). The apparatus generally includes means for receiving, from a base station, allocation of uplink resources for communications with the base station on a first frequency band that is narrower than a second frequency band used by a second type of UE to communicate with the base station, wherein the uplink resources are allocated in a narrowband subframe structure with an increased symbol duration relative to uplink resources allocated to the second type of UE and wherein the narrowband subframe structure comprises at least two symbols and has a same duration as a subframe structure used to communicate with the second type of UE, and means for performing uplink transmissions on the allocated resources.

Certain aspects of the present disclosure provide a computer readable medium for wireless communications by a first type of user equipment (UE). The computer readable medium generally includes instructions stored thereon, the instructions being executable by one or more processors for receiving, from a base station, allocation of uplink resources for communications with the base station on a first frequency band that is narrower than a second frequency band used by a second type of UE to communicate with the base station, wherein the uplink resources are allocated in a narrowband subframe structure with an increased symbol duration relative to uplink resources allocated to the second type of UE and wherein the narrowband subframe structure comprises at least two symbols and has a same duration as a subframe structure used to communicate with the second type of UE, and performing uplink transmissions on the allocated resources.

Certain aspects of the present disclosure provide a method for wireless communications by a base station (BS). The method generally includes allocating uplink resources to one or more first type of user equipments (UEs) that communicate with the BS on a first frequency band that is narrower than a second frequency band used to communicate with a second type of UE, wherein the uplink resources are allocated in a narrowband subframe structure with an increased symbol duration relative to uplink resources allocated to the second type of UE and wherein symbols in the narrowband subframe structure are aligned with a boundary of a set of multiple subframe structures used to communicate with the second type of UE, and receiving uplink transmissions from the first type of UE on the allocated resources.

Certain aspects of the present disclosure provide an apparatus for wireless communications by a base station (BS). The apparatus generally includes a processing system configured to allocate uplink resources to one or more first type of user equipments (UEs) that communicate with the BS on a first frequency band that is narrower than a second frequency band used to communicate with a second type of UE, wherein the uplink resources are allocated in a narrowband subframe structure with an increased symbol duration relative to uplink resources allocated to the second type of UE and wherein symbols in the narrowband subframe structure are aligned with a boundary of a set of multiple subframe structures used to communicate with the second type of UE, and a receiver configured to receive uplink transmissions from the first type of UE on the allocated resources.

Certain aspects of the present disclosure provide an apparatus for wireless communications by a base station (BS). The apparatus generally includes means for allocating uplink resources to one or more first type of user equipments (UEs) that communicate with the BS on a first frequency band that is narrower than a second frequency band used to communicate with a second type of UE, wherein the uplink resources are allocated in a narrowband subframe structure with an increased symbol duration relative to uplink resources allocated to the second type of UE and wherein symbols in the narrowband subframe structure are aligned with a boundary of a set of multiple subframe structures used to communicate with the second type of UE, and means for receiving uplink transmissions from the first type of UE on the allocated resources.

Certain aspects of the present disclosure provide a computer readable medium for wireless communications by a base station (BS). The computer readable medium generally includes instructions stored thereon, the instructions being executable by one or more processors for allocating uplink resources to one or more first type of user equipments (UEs) that communicate with the BS on a first frequency band that is narrower than a second frequency band used to communicate with a second type of UE, wherein the uplink resources are allocated in a narrowband subframe structure with an increased symbol duration relative to uplink resources allocated to the second type of UE and wherein symbols in the narrowband subframe structure are aligned with a boundary of a set of multiple subframe structures used to communicate with the second type of UE, and receiving uplink transmissions from the first type of UE on the allocated resources.

Certain aspects of the present disclosure provide a method for wireless communications by a first type of user equipment (UE). The method generally includes receiving, from a base station, an allocation of uplink resources for communications with the base station on a first frequency band that is narrower than a second frequency band used by a second type of UE to communicate with the base station, wherein the uplink resources are allocated in a narrowband subframe structure with an increased symbol duration relative to uplink resources allocated to the second type of UE and wherein symbols in the narrowband subframe structure are aligned with a boundary of a set of multiple subframe structures used to communicate with the second type of UE, and performing uplink transmissions on the allocated resources.

Certain aspects of the present disclosure provide an apparatus for wireless communications by a first type of user equipment (UE). The apparatus generally includes a receiver configured to receive, from a base station, an allocation of uplink resources for communications with the base station on a first frequency band that is narrower than a second frequency band used by a second type of UE to communicate with the base station, wherein the uplink resources are allocated in a narrowband subframe structure with an increased symbol duration relative to uplink resources allocated to the second type of UE and wherein symbols in the narrowband subframe structure are aligned with a boundary of a set of multiple subframe structures used to communicate with the second type of UE, and a transmitter configured to perform uplink transmissions on the allocated resources.

Certain aspects of the present disclosure provide an apparatus for wireless communications by a first type of user equipment (UE). The apparatus generally includes means for receiving, from a base station, an allocation of uplink resources for communications with the base station on a first frequency band that is narrower than a second frequency band used by a second type of UE to communicate with the base station, wherein the uplink resources are allocated in a narrowband subframe structure with an increased symbol duration relative to uplink resources allocated to the second type of UE and wherein symbols in the narrowband subframe structure are aligned with a boundary of a set of multiple subframe structures used to communicate with the second type of UE, and means for performing uplink transmissions on the allocated resources.

Certain aspects of the present disclosure provide a computer readable medium for wireless communications by a first type of user equipment (UE). The computer readable medium generally includes instructions stored thereon, the instructions being executable by one or more processors for receiving, from a base station, an allocation of uplink resources for communications with the base station on a first frequency band that is narrower than a second frequency band used by a second type of UE to communicate with the base station, wherein the uplink resources are allocated in a narrowband subframe structure with an increased symbol duration relative to uplink resources allocated to the second type of UE and wherein symbols in the narrowband subframe structure are aligned with a boundary of a set of multiple subframe structures used to communicate with the second type of UE, and performing uplink transmissions on the allocated resources.

Numerous other aspects are provided including methods, apparatus, systems, computer program products, and processing systems.

BRIEF DESCRIPTION OF THE DRAWINGS

FIGS. 15A-15C illustrate example subframe sampling sizes for legacy and narrowband subframe structures, in accordance with certain aspects of the present disclosure.

FIGS. 16A-16C illustrate example subframe sampling sizes for a narrowband subframe structure, in accordance with certain aspects of the present disclosure.

FIG. 19 illustrates an example of determining a narrowband subframe structure used for uplink communications by a first type of UE based on characteristics of communications between a base station and a second type of UE, in accordance with certain aspects of the present disclosure.

DETAILED DESCRIPTION

Low cost, low data rate UEs, in some cases, may coexist in a network with devices having a larger amount of radio resources (e.g., more receive chains). Aspects of the present disclosure provide techniques for providing coexistence between low cost, low data rate UEs and UEs having greater communications capabilities by aligning subframe and/or slot timing for uplink communications by low cost, low data rate UEs with subframe timing for uplink communications by UEs with greater communications capabilities.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Figure 1:
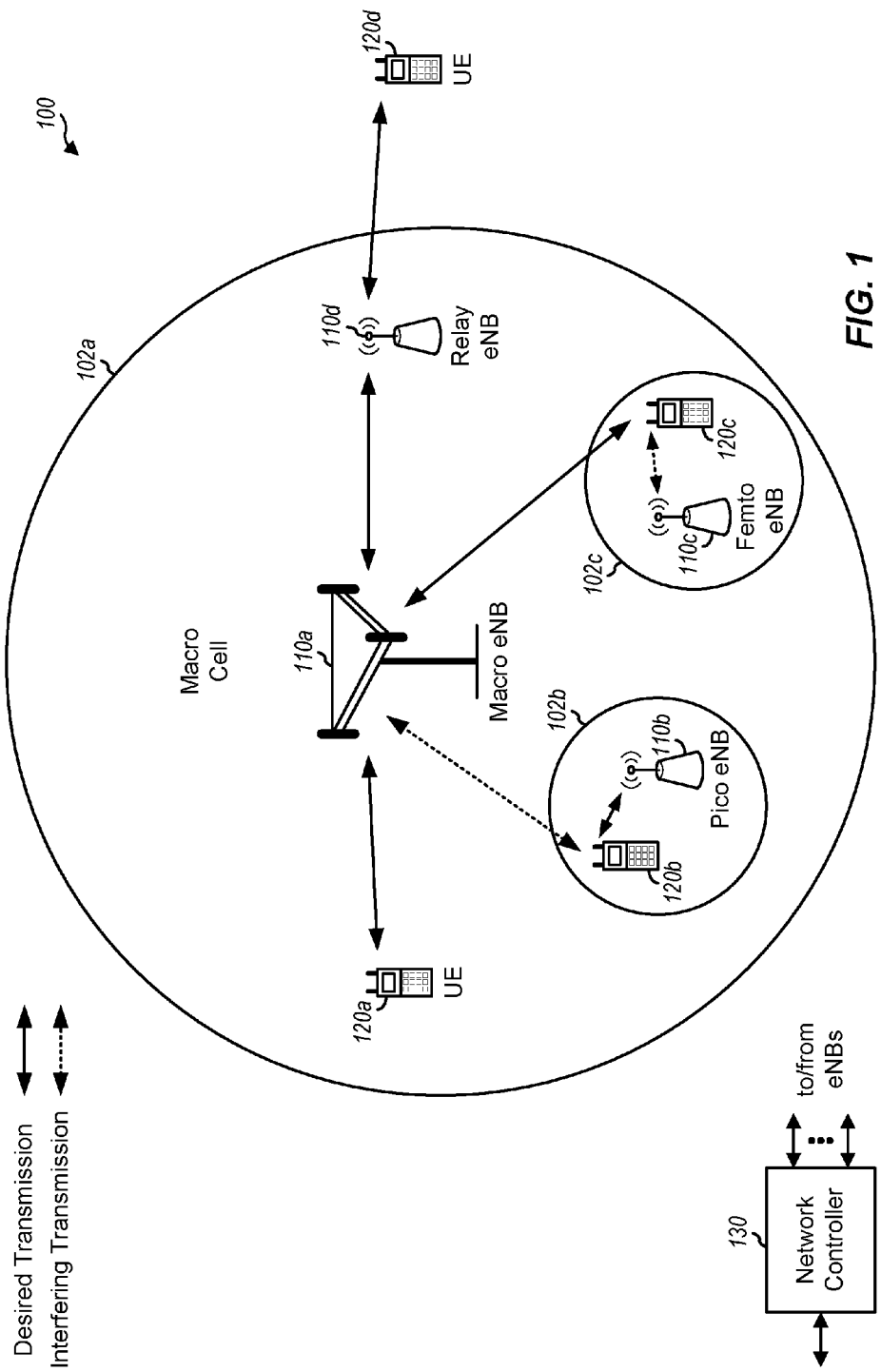
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, techniques presented herein may be used to help UEs and BSs shown in FIG. 1 communicate on a machine type physical downlink control channel (mPDCCH) using a narrowband (e.g., six-PRB) based search space.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station (BS), a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

One or more UEs 120 in the wireless communication network 100 (e.g., an LTE network) may also be a narrowband bandwidth UE. These UEs may co-exist with legacy and/or advanced UEs (e.g., capable of operating on a wider bandwidth) in the LTE network and may have one or more capabilities that are limited when compared to the other UEs in the wireless network. For example, in LTE Rel-12, when compared to legacy and/or advanced UEs in the LTE network, the narrowband UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the narrowband UEs may have a relaxed switching timing from transmit to receive (or from receive to transmit) operations. For example, in one case, compared to a switching timing of 20 microseconds (us) for legacy and/or advanced UEs, the narrowband UEs may have a relaxed switching timing of 1 millisecond (ms).

In some cases, the narrowband UEs (e.g., in LTE Rel-12) may also be able to monitor downlink (DL) control channels in the same away as legacy and/or advanced UEs in the LTE network monitor DL control channels. Release 12 narrowband UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

According to certain aspects, narrowband UEs may be limited to a particular narrowband assignment of 1.4 MHz or six resource blocks (RBs) partitioned out of the available system bandwidth) while co-existing within a wider system bandwidth (e.g., at 1.4/3/5/10/15/20 MHz). Additionally, narrowband UEs may also be able to support one or more coverage modes of operation. For example, the narrowband UE may be able to support coverage enhancements up to 15 dB.

As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

In some cases, a UE (e.g., a narrowband UE or a wideband UE) may perform a cell search and acquisition procedure before communicating in the network. In one case, with reference to the LTE network illustrated in FIG. 1 as an example, the cell search and acquisition procedure may be performed when the UE is not connected to a LTE cell and wants to access the LTE network. In these cases, the UE may have just powered on, restored a connection after temporarily losing connection to the LTE cell, etc.

In other cases, the cell search and acquisition procedure may be performed when the UE is already connected to a LTE cell. For example, the UE may have detected a new LTE cell and may prepare a handover to the new cell. As another example, the UE may be operating in one or more low power states (e.g., may support discontinuous reception (DRX)) and, upon exiting the one or more low power states, may have to perform the cell search and acquisition procedure (even though the UE is still in connected mode).

Figure 2:
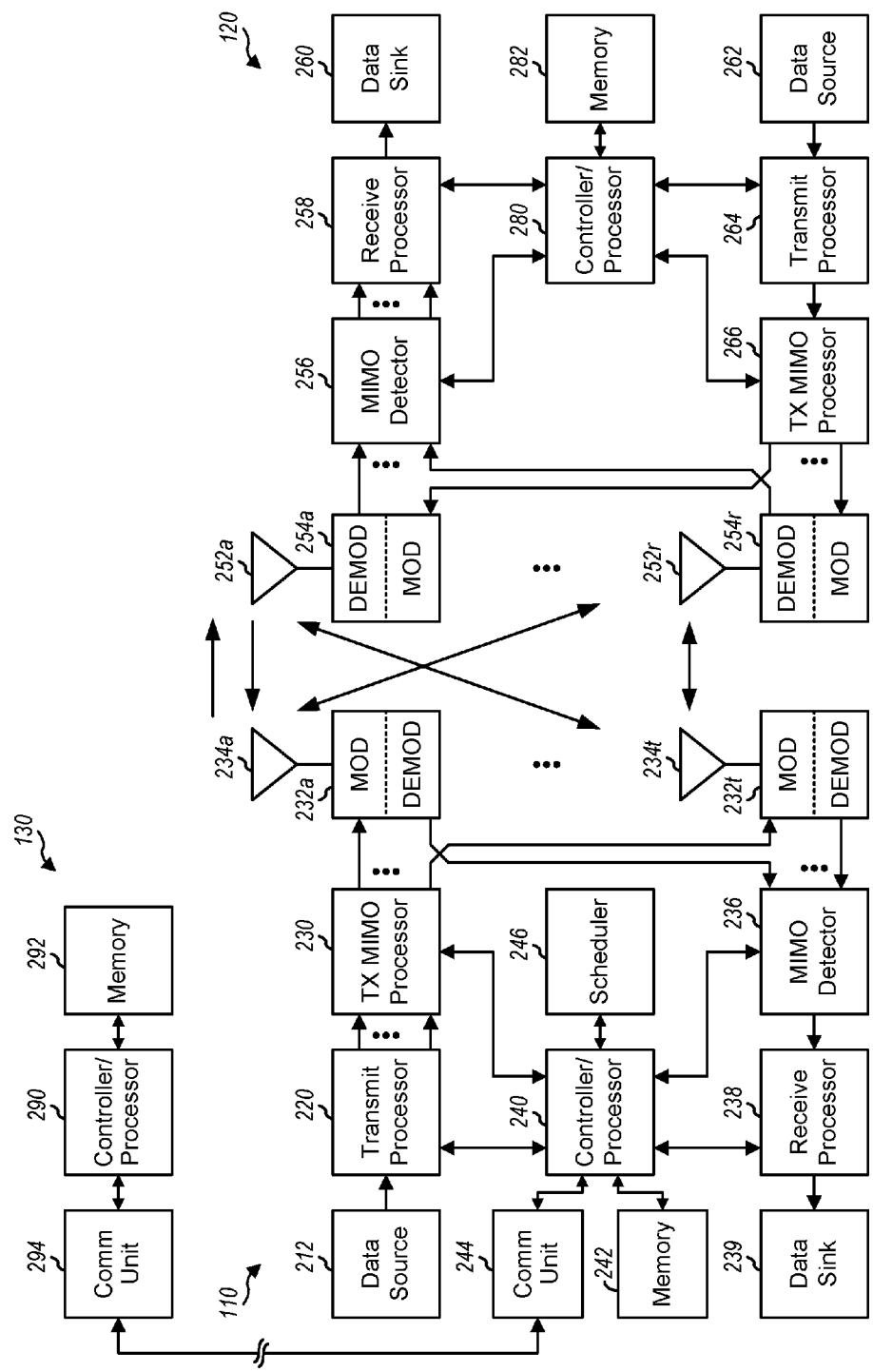
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. For example, processor 280 and/or other processors and modules at UE 120, may perform or direct operations 600 shown in FIG. 6, operations 700 shown in FIG. 7, operations 900 shown in FIG. 9, operations 1000 shown in FIG. 10, operations 1300 shown in FIG. 13, operations 1400 shown in FIG. 14, operations 1700 shown in FIG. 17, operations 1800 shown in FIG. 18, operations 2100 shown in FIG. 21, and/or operations 2200 shown in FIG. 22. Memories 242 and 282 may store data and program codes for base station 110 and UE 120, respectively. A scheduler 246 may schedule UEs for data transmission on the downlink and/or uplink.

Figure 3:
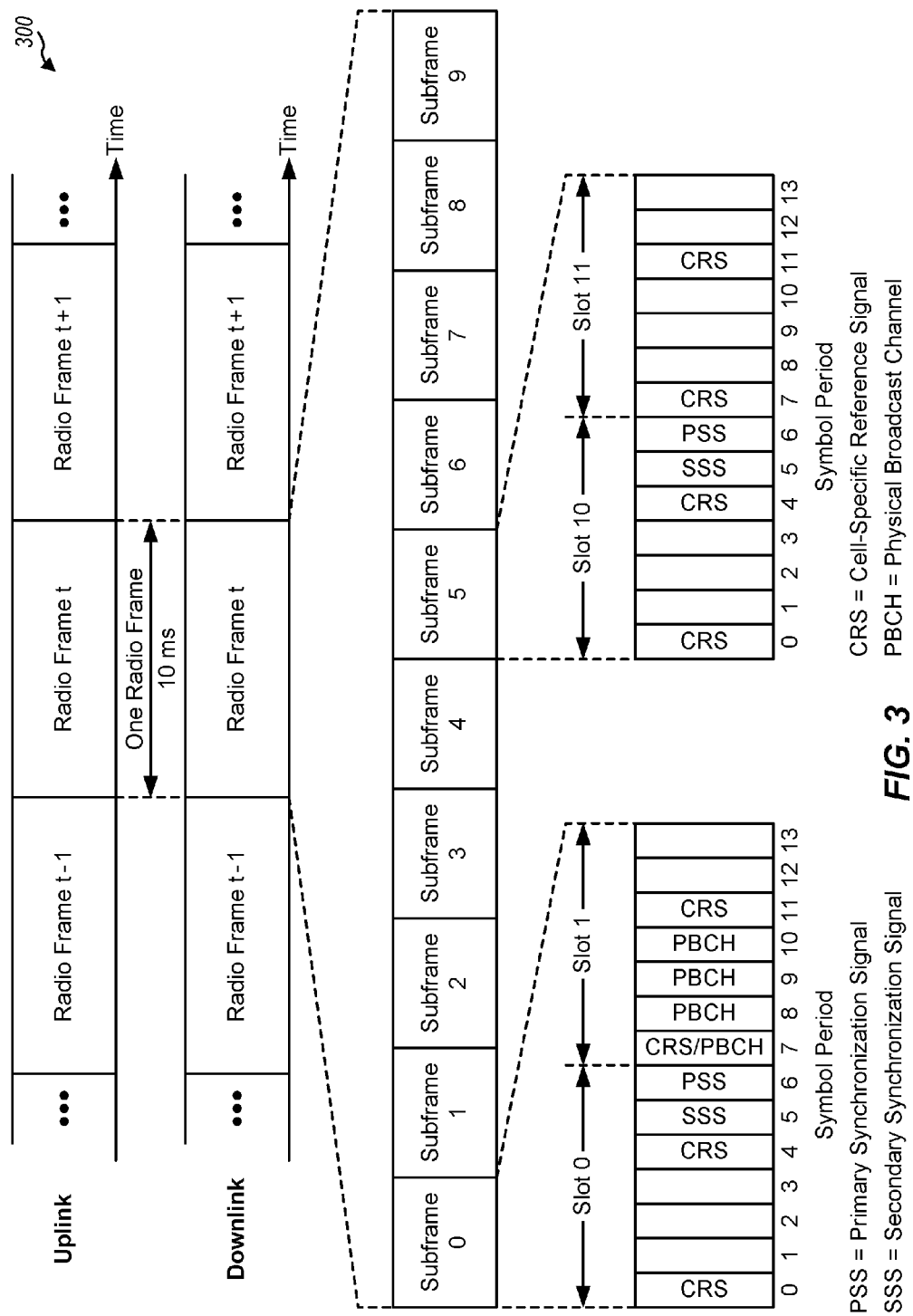
FIG. 3 shows an exemplary frame structure for FDD in LTE.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition and may contain, among other information, the cell ID along with an indication of the duplexing mode. The indication of the duplexing mode may indicate whether the cell utilizes a time division duplexing (TDD) or frequency division duplexing (FDD) frame structure. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Channel quality measurements may be performed by a UE according to a defined schedule, such one based on the DRX cycle of the UE. For example, a UE may attempt to perform measurements for a serving cell at every DRX cycle. The UE may also attempt to perform measurements for non-serving neighboring cells. Measurements for non-serving neighbor cells may be made based on a different schedule than for serving cells and the UE may need to tune away from the serving cell to measure non-serving cells when the UE is in connected mode.

To facilitate channel quality measurements, an eNB may transmit a cell specific reference signal (CRS) on specific subframes. For example, an eNB may transmit CRS over subframes 0 and 5 for a given frame. A narrowband UE may receive this signal and measure the average power of the received signal, or RSRP. The narrowband UE may also calculate a Receive Signal Strength Indicator (RSSI) based on the total received signal power from all sources. A RSRQ may also be calculated based on the RSRP and RSSI.

To facilitate measurements, an eNB may provide a measurement configuration to UEs in its coverage area. The measurement configuration may define event triggers for measurement reporting and each event trigger may have associated parameters. When the UE detects a configured measurement event, it may respond by sending a measurement report to the eNB with information about the associated measurement objects. A configured measurement event may be, for example, a measured reference signal received power (RSRP) or a measured reference signal received quality (RSRQ) satisfying a threshold. A time-to-trigger (TTT) parameter can be used to define how long a measurement event must persist before the UE sends its measurement report. In this way, the UE can signal changes in its radio conditions to the network.

Figure 4:
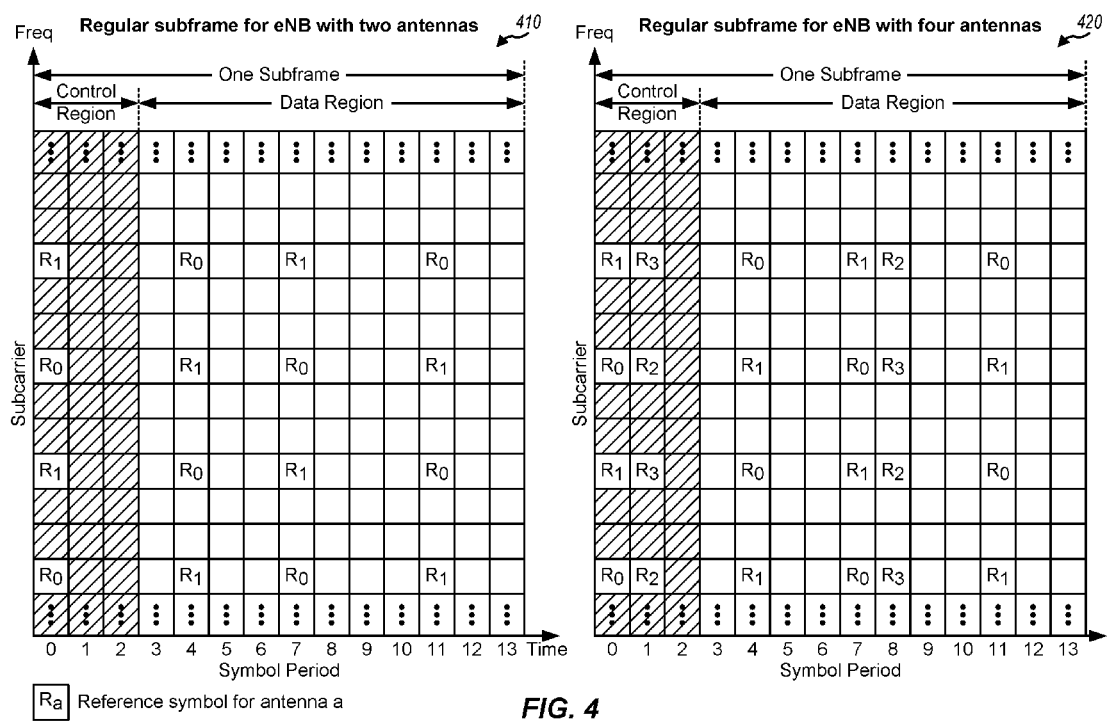
FIG. 4 shows two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

The focus of traditional LTE design is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

Thus, as described above, one or more UEs in the wireless communication network (e.g., wireless communication network 100) may be devices that have limited communication resources, such as narrowband UEs, as compared to other (wideband) devices in the wireless communication network. For narrowband UEs, various requirements may be relaxed as only a limited amount of information may need to be exchanged. For example, maximum bandwidth may be reduced (relative to wideband UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

In some cases, if half-duplex operation is performed, narrowband UEs may have a relaxed switching time to transition from transmitting to receiving (or receiving to transmitting). For example, the switching time may be relaxed from 20 μs for regular UEs to 1 ms for narrowband UEs. Release 12 narrowband UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., ePDCCH).

In some systems, for example, in LTE Rel-13, the narrowband may be limited to a particular narrowband assignment (e.g., of no more than six resource blocks (RBs)) within the available system bandwidth. However, the narrowband may be able to re-tune (e.g., operate and/or camp) to different narrowband regions within the available system bandwidth of the LTE system, for example, in order to co-exist within the LTE system As another example of coexistence within the LTE system, narrowband UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the narrowband UEs may be able to receive the legacy PBCH with one or more additional repetitions of the PBCH across multiple subframes. As another example, the narrowband UEs may be able to transmit one or more repetitions of PRACH (e.g., with one or more PRACH formats supported) to an eNB in the LTE system. The PRACH may be used to identify the narrowband UE. Also, the number of repeated PRACH attempts may be configured by the eNB.

The narrowband UE may also be a link budget limited device and may operate in different modes of operation (e.g. entailing different amounts of repeated messages transmitted to the narrowband UE) based on its link budget limitation. For example, in some cases, the narrowband UE may operate in a normal coverage mode in which there is little to no repetition (i.e., the amount of repetition needed for the UE to successfully receive a message may be low or repetition may not even be needed). Alternatively, in some cases, the narrowband UE may operate in a coverage enhancement (CE) mode in which there may be high amounts of repetition. For example, for a 328 bit payload, a narrowband UE in CE mode may need 150 or more repetitions of the payload in order to successfully receive the payload.

In some cases, for example, for LTE Rel-13, narrowband UEs may have limited capabilities with respect to its reception of broadcast and unicast transmissions. For example, the maximum transport block (TB) size for a broadcast transmission received by the narrowband UE may be limited to 1000 bits. Additionally, in some cases, the narrowband UE may not be able to receive more than one unicast TB in a subframe. In some cases (e.g., for both the CE mode and normal mode described above), the narrowband UE may not be able to receive more than one broadcast TB in a subframe. Further, in some cases, the narrowband UE may not be able to receive both a unicast TB and a broadcast TB in a subframe.

Narrowband UEs that co-exist in the LTE system may also support new messages for certain procedures, such as paging, random access procedure, etc. (e.g., as opposed to conventional messages used in LTE for these procedures). The new messages for paging, random access procedure, and so on may be separate from the messages used for similar procedures associated with non-narrowband UEs. For example, as compared to conventional paging messages used in LTE, narrowband UEs may able to monitor and/or receive paging messages that non-narrowband UEs may not able to monitor and/or receive. Similarly, as compared to conventional random access response (RAR) messages used in a conventional random access procedure, narrowband UEs may be able to receive RAR messages that also may not be able to be received by non-narrowband UEs. The new paging and RAR messages associated with narrowband UEs may also be repeated one or more times (e.g., "bundled"). In addition, different numbers of repetitions (e.g., different bundling sizes) for the new messages may be supported.

According to certain aspects, multiple narrowband regions, with each narrowband region spanning a bandwidth that is no greater than a total of 6 RBs, may be supported by narrowband UE and/or narrowband operation. In some cases, each narrowband UE in narrowband operation may operate within one narrowband region (e.g., at 1.4 MHz or 6 RBs) at a time. However, narrowband UEs in narrowband operation, at any given time, may re-tune to other narrowband regions in the wider system bandwidth. In some examples, multiple narrowband UEs may be served by the same narrowband region. In other examples, multiple narrowband UEs may be served by different narrowband regions (e.g., with each narrowband region spanning 6 RBs).

In yet other examples, different combinations of narrowband UEs may be served by one or more same narrowband regions and/or one or more different narrowband regions.

Some systems, for example, in LTE Rel-13, introduce coverage enhancements and support for narrowband UEs, as well as other UEs. As used herein, the term coverage enhancement generally refers to any type of mechanism that extends the coverage range of a device (such as a narrowband device) within a network. One approach for coverage enhancement (CE) is bundling which refers to transmitting the same data multiple times (e.g., across multiple subframes or, as will be described in greater detail below, across multiple symbols within a same subframe).

In certain systems, narrowband UEs may support narrowband operation while operating in a wider system bandwidth. For example, a narrowband UE may transmit and receive in a narrowband region of a system bandwidth. As noted above, the narrowband region may span 6 resource blocks (RBs).

Certain systems may provide narrowband UEs with coverage enhancements of up to 15 dB, which maps to 155.7 dB maximum coupling loss between the UE and an eNB. Accordingly, narrowband UEs and eNB may perform measurements at low SNRs (e.g., −15 dB to −20 dB). In some systems, coverage enhancements may include channel bundling, wherein messages associated with narrowband UEs may be repeated (e.g., bundled) one or more times.

Certain devices may be able to communicate both with legacy type communications and non-legacy type communications. For example, some devices may be able to communicating in both narrowband regions (of overall system bandwidth) as well as wider band regions. While the examples above refer to low cost or MTC devices that communicate via narrowband regions, other (non low cost/non-MTC) types of devices may also communicate vie narrowband regions, for example, taking advantage of frequency selectivity and directional transmissions.

Example Uplink Design for Narrowband LTE

Certain aspects of the present discourse provide for uplink resource allocations for a first type of UE that operates on a narrower bandwidth than a second type of UE such that slot and/or subframe boundaries for uplink resources used by the first type of UE aligns with slot and/or subframe boundaries for uplink resources used by the second type of UE.

In some cases, some UEs (e.g., machine type communication (MTC) UEs) may have low cost, low bandwidth designs (e.g., operating on a narrower bandwidth than a bandwidth used by UEs with higher capability designs) which need not be backward compatible with GSM or EDGE technologies. However, in some cases, these low cost, low power UEs ("narrowband UEs") may be compatible with wideband UEs, using a same or similar design for in-band deployment (i.e., narrowband UEs operating within the bandwidth used by wideband UEs) and/or standalone deployment (i.e., narrowband UEs operating outside the bandwidth used by wideband UEs).

For some cases of extreme coverage situations, a minimum coupling loss (MCL) of 164 dB may be needed. A design may have high power efficiency, support a large number of devices, and be implemented at a low cost. In some cases, a 200 kHz channel bandwidth may be used for communications by narrowband UEs.

Figure 5:
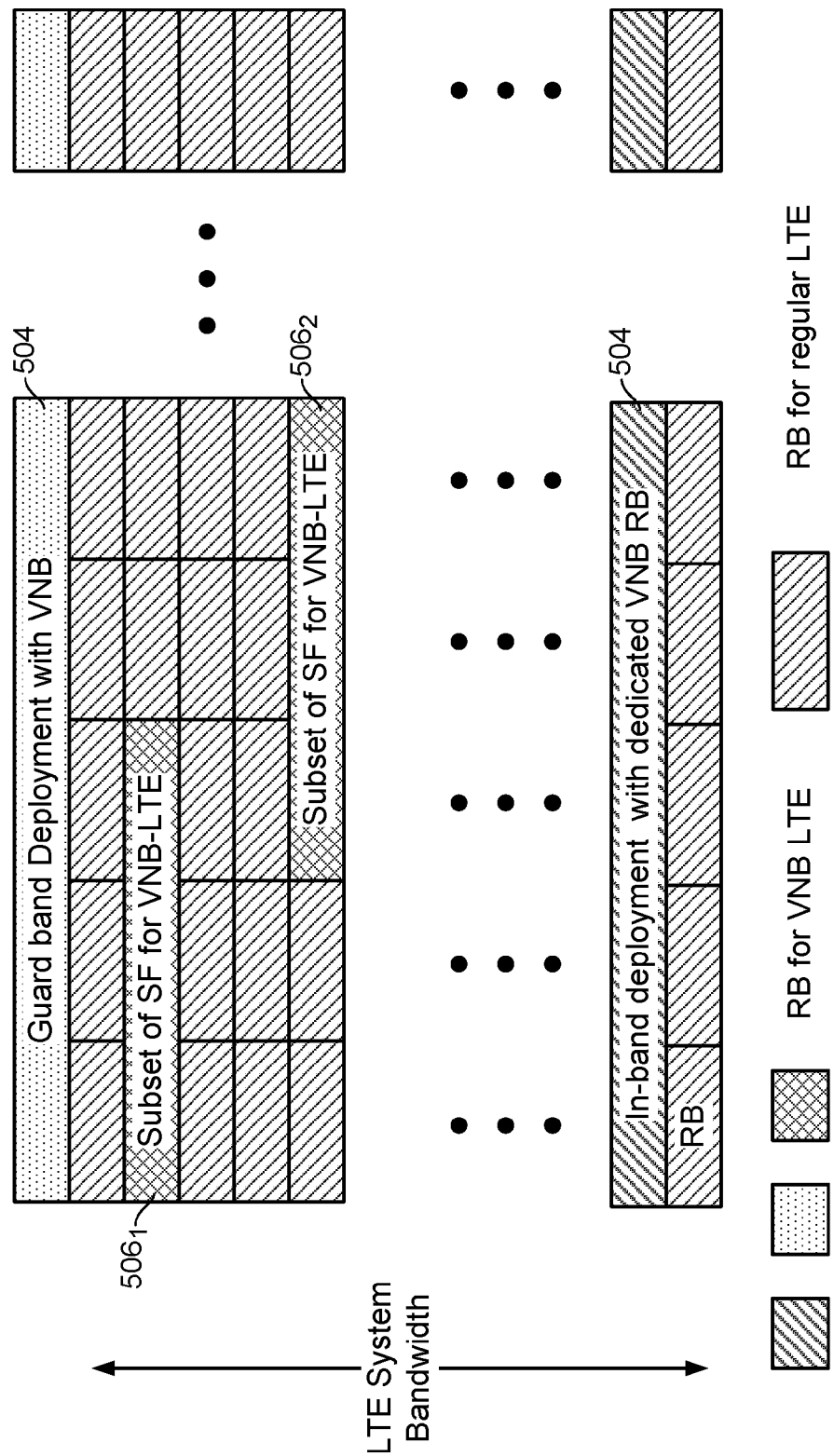
FIG. 5 illustrates examples of narrowband deployments within a larger system bandwidth, in accordance with certain aspects of the present disclosure.

FIG. 5 illustrates a variety of deployments in which a narrowband may be deployed within a larger system bandwidth. As illustrated, a narrowband may be a single LTE resource block with a bandwidth of 180 kHz and a 20 kHz guardband. By using a single LTE resource block for narrowband communications, higher layers of the LTE stack and most of the hardware may be reused. Additionally, narrowband UEs may implement enhanced machine type communications (eMTC) and narrowband LTE, which may avoid fragmentation. As illustrated, these narrowbands may overlap, at least in part, with the system bandwidth (e.g., used by a wideband UE) or may exist outside of the system bandwidth.

In one case, as illustrated by deployment 502, the narrowband may be deployed within the system bandwidth (e.g., inside the system bandwidth used by a wideband UE) and dedicated for use by narrowband UEs. Resource blocks in a wideband channel may be used for narrowband communications. In another case, as illustrated by deployment 504, the narrowband may be deployed within a guardband outside (or between) different channels. In still another case, though not illustrated, a narrowband channel may be a standalone channel. For example, a narrowband channel used for communications by narrowband UEs may be deployed in GSM spectrum and may use a single 200 kHz carrier. As illustrated, in some cases, certain subsets of subframes 506 may be allocated for narrowband transmissions. The subsets of subframes 506 used for narrowband transmissions may be distributed through the system bandwidth. In some cases, as illustrated, a first subset of subframes $506_1$ may partially overlap with other subsets of subframes 506 (e.g., a second subset of subframes $506_2$).

In communications between a UE and an eNodeB (eNB), a UE typically performs a transmission on a physical random access channel (PRACH). The eNB detects the PRACH transmission and sends a timing advance command, and a UE transmits information over a physical uplink shared channel (PUSCH), which may have a minimum allocation of 1 resource block (RB).

In some aspects, a narrowband UE may perform PRACH transmissions using 1RB, which may decrease the timing resolution relative to PRACH transmission sent using a wider bandwidth. The timing resolution for a wider bandwidth of 6 RBs may be roughly 1 microsecond, while the timing resolution for a narrow band of 1 RB may be roughly 5 microseconds. The timing advance command may lose accuracy due to the reduced timing resolution of a 1RB narrow band and potentially a lower signal to noise ratio. In some cases, UEs in deep coverage may be power limited (i.e., may not benefit from additional bandwidth), which may allow the use of sub-RB assignments to increase multiplexing capabilities of narrowband communications (e.g., 1 RB bandwidth LTE communications).

In one design, the uplink numerology of a wideband LTE subframe may be multiplied by a factor of 6 for narrowband LTE communications. Each symbol and cyclic prefix may be six times longer, with a subcarrier spacing of 2.5 kHz. Multiplying the uplink numerology may allow time inaccuracy to be higher without losing efficiency in terms of overhead, and may allow for a large number of UEs to be multiplexed simultaneously. However, multiplying the uplink numerology by a factor of 6 may cause narrowband LTE transmissions to lose orthogonality with wideband (legacy) LTE transmissions, which may result in additional interference. If wideband UEs and narrowband UEs are time-multiplexed in the same RB, the additional cyclic prefix length may not be able to compensate for timing advance errors. Finally, differences between the scheduling time unit for narrowband UEs and wideband UEs may impose issues with scheduling, time-domain duplexed operations, and multiplexing narrowband LTE PUSCH with wideband sounding reference signals.

In some cases, narrowband LTE transmission and wideband LTE transmissions may use the same subframe structure and numerology.

Figure 6:
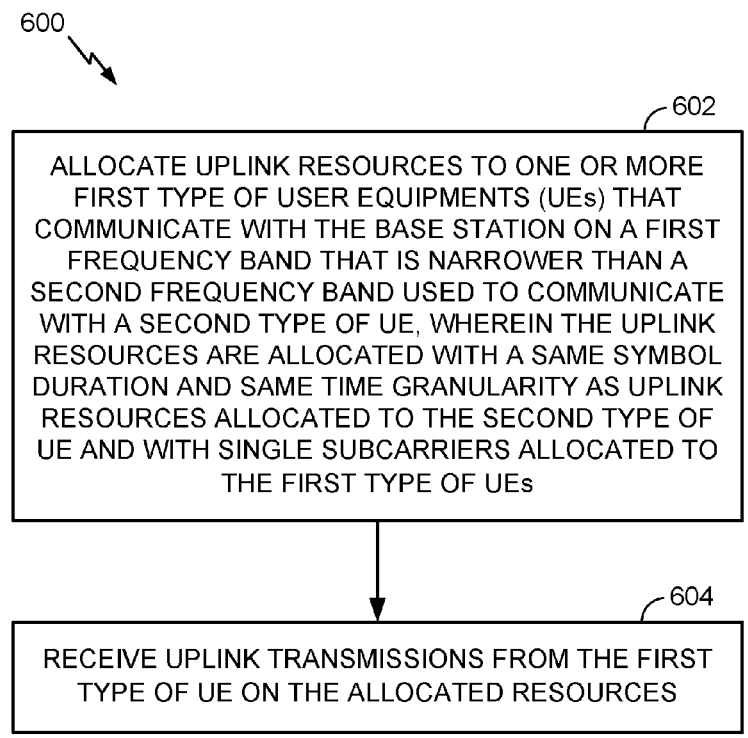
FIG. 6 illustrates example operations that may be performed by a base station to communicate with UEs on a narrow frequency band relative to a second frequency band, in accordance with certain aspects of the present disclosure.

FIG. 6 illustrates example operations 600 that may be performed, for example, by a base station to allocate uplink resources to a first type of UE (e.g., to a narrowband UE according to "scheme 1"), according to aspects of the present disclosure.

Operations 600 may begin at 602, where a base station allocates uplink resources to one or more first type of UEs that communicate with the base station on a first frequency band that is narrower than a second frequency band used to communicate with a second type of UE. The uplink resources may be allocated with a same symbol duration and same time granularity as uplink resources allocated to the second type of UE and with single subcarriers allocated to the first type of UEs. At 604, the base station receives uplink transmission from the first type of UE on the allocated resources.

Figure 7:
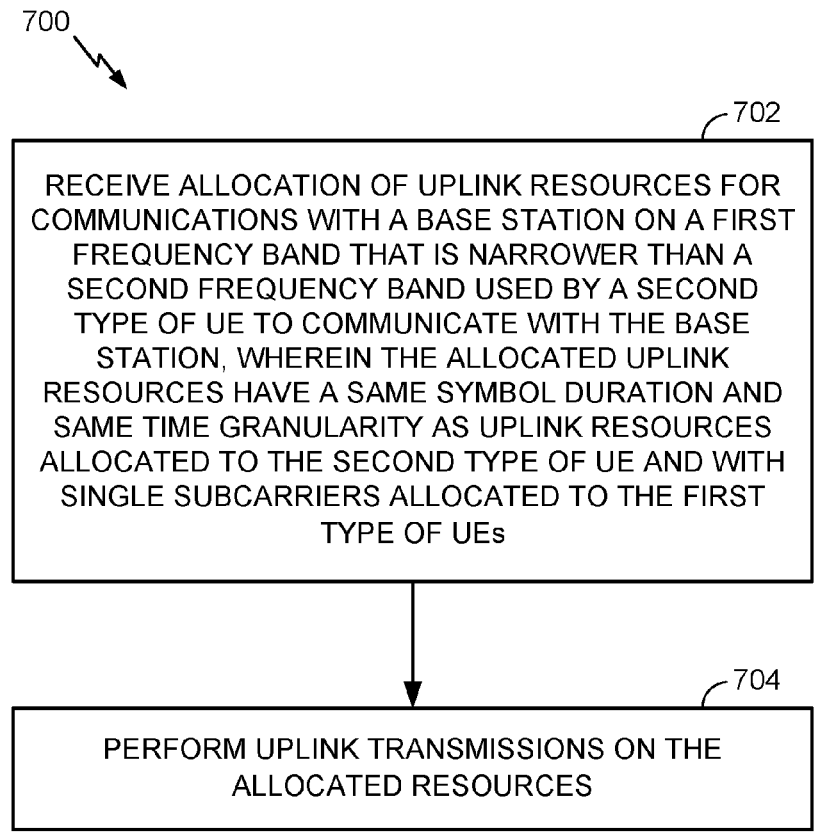
FIG. 7 illustrates example operations that may be performed by a user equipment (UE) to communicate with a base station on a narrow frequency band relative to a second frequency band, in accordance with certain aspects of the present disclosure.

FIG. 7 illustrates example operations 700 that may be performed, for example, by a first type of UE (e.g., a narrowband UE) to communicate with a base station on allocated resources (e.g., allocated by a base station performing operations described above with reference to FIG. 6), according to aspects of the present disclosure.

Operations 700 may begin at 702, where the UE receives an allocation of uplink resources for communications with a base station on a first frequency band that is narrower than a second frequency band used by a second type of UE to communicate with the base station. The allocated uplink resources may have a same symbol duration and same time granularity as uplink resources allocated to the second type of UE, and single subcarriers may be allocated to the first type of UEs. AT 704, the UE performs uplink transmissions on the allocated resources.

In one aspect, (hereinafter "scheme 1") the uplink numerology used for narrowband LTE communications may remain the same as the uplink numerology used for wideband (legacy) LTE communications. Sub-carriers may have a spacing of 15 kHz, and subframes may have a duration of 1 millisecond. For deep coverage UEs, single tone transmission may be used. Code division multiplexing (CDM) may be applied over time to multiplex more UEs within the 180 kHz available for communications in the resource block (e.g., within a single subcarrier or groups of subcarriers in the 180 kHz available for use in the resource block). In some cases, a base station can indicate that UEs are to rate match around SRS symbols used by wideband UEs. By using a same numerology for both wideband and narrowband LTE communications, narrowband communications may not interfere with wideband communications, and narrowband LTE communications may be compatible with frequency division duplexed (FDD) and time division duplexed (TDD) in-band deployments. Because the cyclic prefix length remains the same for both narrowband and wideband LTE communications, timing estimation inaccuracies may be present in narrowband communications.

Figure 8:
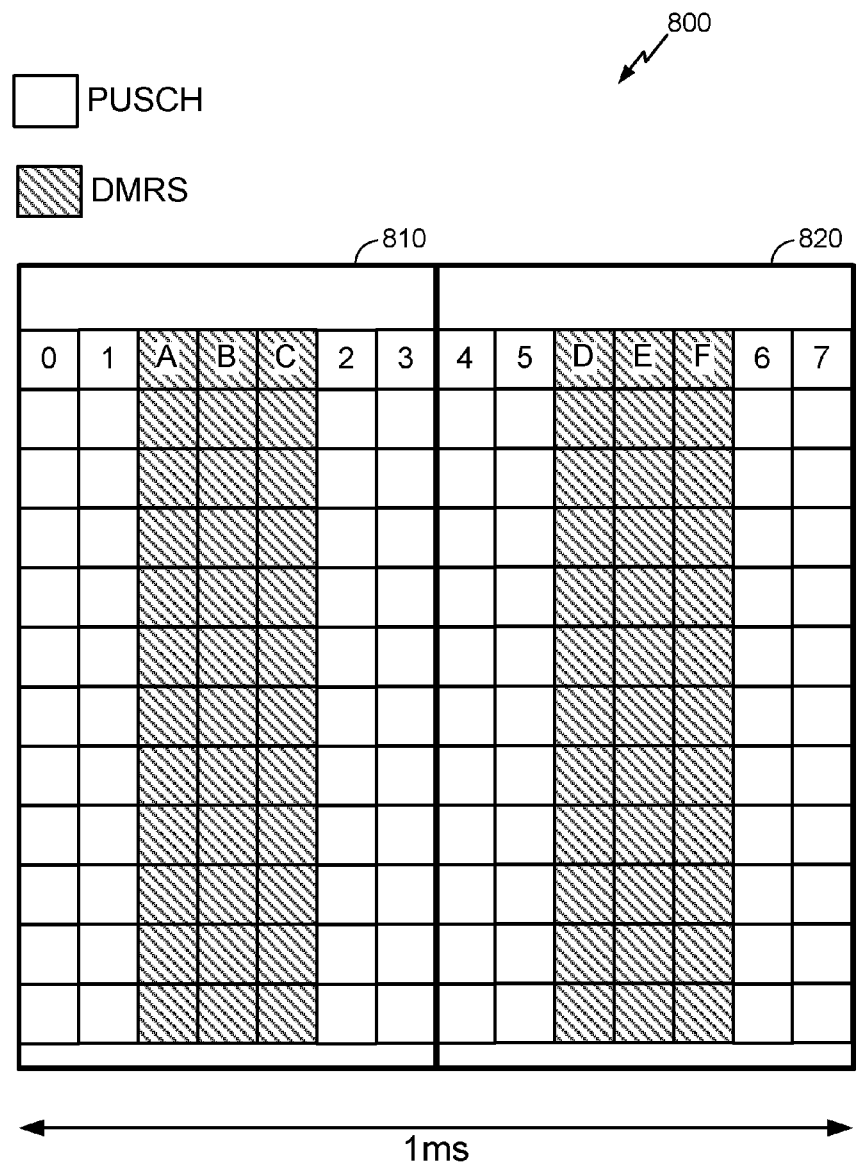
FIG. 8 illustrates an example narrowband subframe structure, in accordance with certain aspects of the present disclosure.

FIG. 8 illustrates an example subframe 800, according to an aspect of the present disclosure. As illustrated, the subframe 800 includes 8 time intervals for PUSCH transmissions and 6 time intervals for demodulation reference signal (DMRS) transmissions. The subframe may be divided into two slots: a first slot 810 including PUSCH symbols 0-3 and DMRS symbols A, B, and C; and a second slot 820 including PUSCH symbols 4-7 and DMRS symbols D, E, and F.

In one case, three UEs may be multiplexed per tone. Code division multiplexing (CDM) with orthogonal sequences between symbols 0, 1, 2, and 3 may be used, with one UE receiving 2 sequences, and two UEs receiving a single sequence. DMRS for the three UEs may be multiplexed using different spreading sequences, with each UE receiving a single DMRS per slot (e.g., each UE may receive a single DMRS in first slot 810 and a single DMRS in second slot 820).

In another case, six UEs may be multiplexed per tone. Code division multiplexing (CDM) with 8 orthogonal sequences may be used for symbols 0-7, with two UEs receiving 2 sequences, and the remaining four UEs receiving one sequence each. DMRS for the 6 UEs may be multiplexed using different spreading sequences, with each UE receiving a single DMRS per subframe.

In some cases, (hereinafter "scheme 3") an extended cyclic prefix numerology may be used for narrowband LTE transmissions performed in-band with wideband LTE transmissions, regardless of whether or not the wideband LTE transmissions use a normal or extended cyclic prefix. Using an extended cyclic prefix, narrowband transmissions may have 6 OFDM symbols per slot (instead of 7 OFDM symbols if a normal cyclic prefix were used). The cyclic prefix may have a length of 16.7 microseconds, which may provide an additional cushion for timing errors. Code division multiplexing may be used to increase multiplexing capabilities.

The increased cyclic prefix length may improve time accuracy at the expense of efficiency. Narrowband LTE transmissions using an extended cyclic prefix may remain time aligned with wideband LTE transmissions, regardless of whether or not the wideband LTE transmissions use a normal or extended cyclic prefix. If wideband LTE transmissions use a normal cyclic prefix, using an extended cyclic prefix for narrowband LTE transmissions may result in a loss of orthogonality.

In some cases, (hereinafter "scheme 2"), an increased symbol duration and narrower subcarrier spacing relative to wideband LTE symbol duration and subcarrier spacing may be used for narrowband LTE transmissions.

Figure 9:
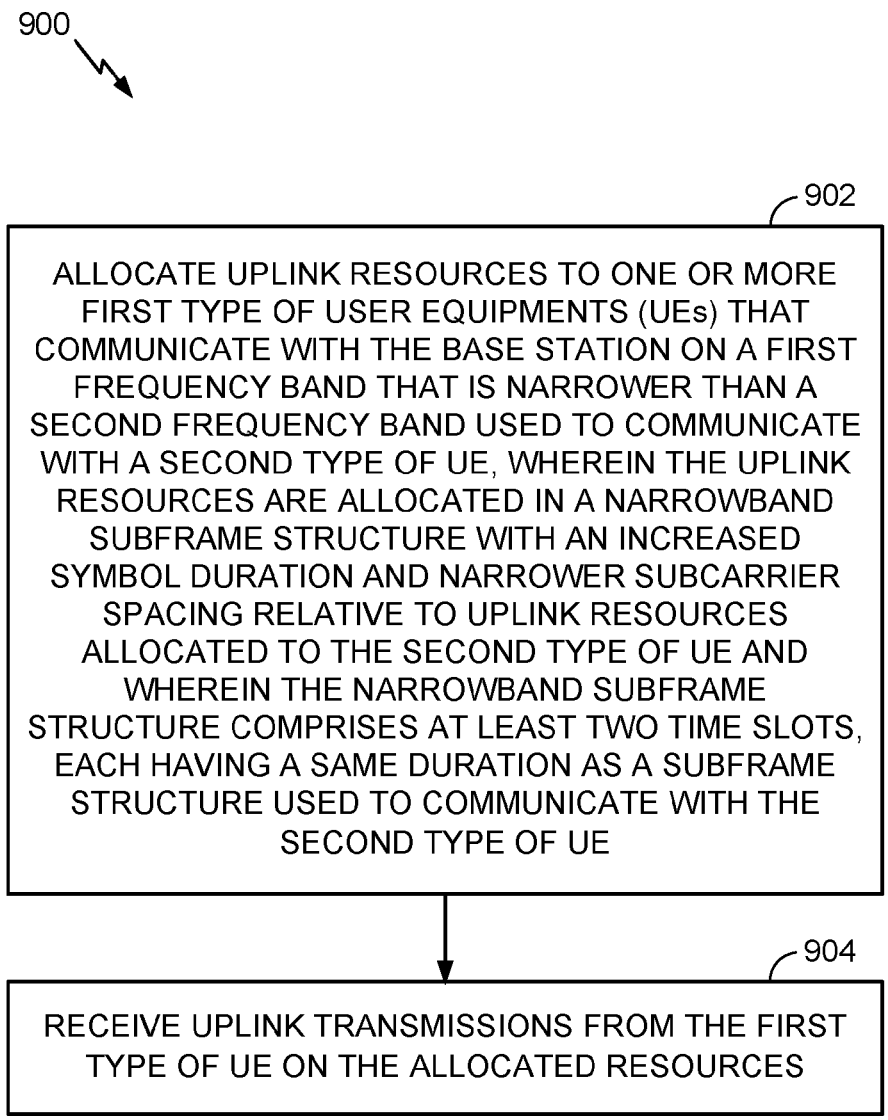
FIG. 9 illustrates example operations that may be performed by a base station to communicate with UEs on a narrow frequency band relative to a second frequency band, in accordance with certain aspects of the present disclosure.

FIG. 9 illustrates example operations 900 that may be performed by a base station to allocate uplink resources (per scheme 2) to a first type of UE (e.g., a narrowband UE), according to aspects of the present disclosure. Operations 900 may begin at 902, where the base station allocates uplink resources to one or more first type of user equipments (UEs) that communicate with the base station on a first frequency band that is narrower than a second frequency band used to communicate with a second type of UE. The uplink resources may be allocated in a narrowband subframe structure with an increased symbol duration and narrower subcarrier spacing relative to uplink resources allocated to the second type of UE. The narrowband subframe structure may comprise at least two time slots, and each time slot may have a same duration as a subframe structure used to communicate with the second type of UE. At 904, the base station receives uplink transmissions from the first type of UE on the allocated resources.

Figure 10:
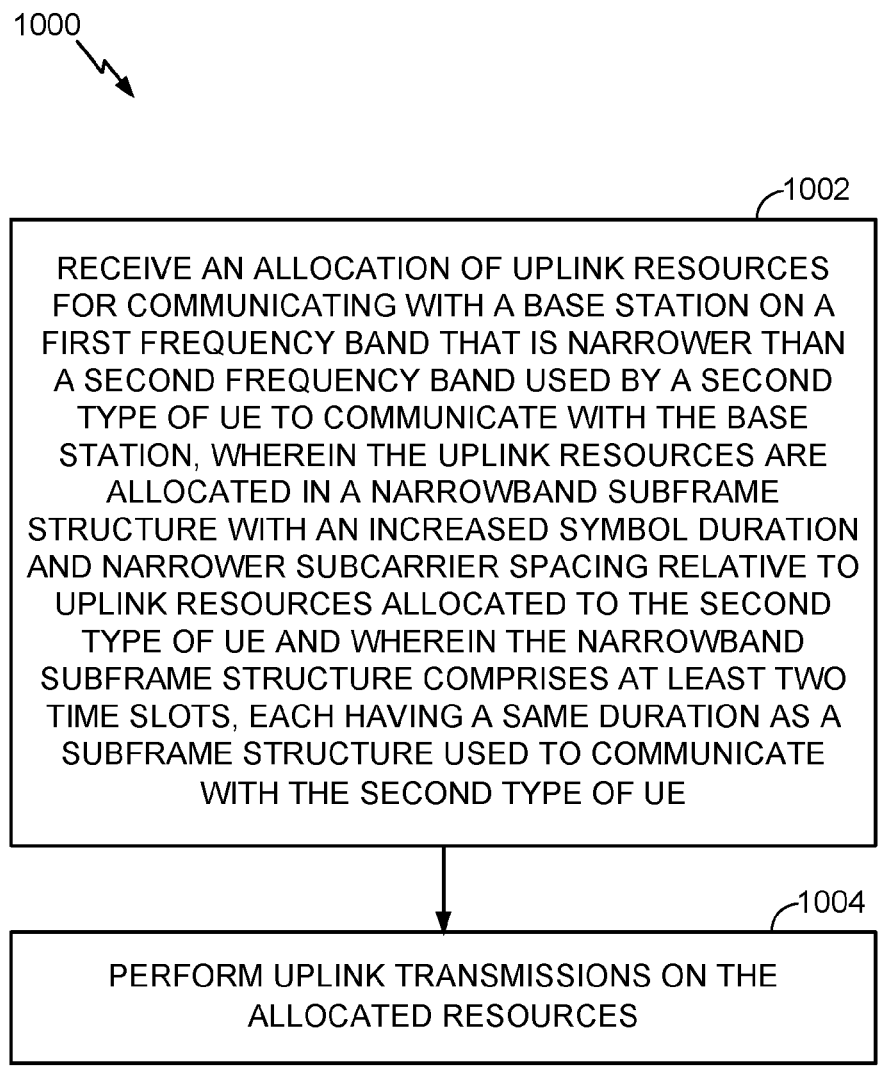
FIG. 10 illustrates example operations that may be performed by a user equipment (UE) to communicate with a base station on a narrow frequency band relative to a second frequency band, in accordance with certain aspects of the present disclosure.

FIG. 10 illustrates example operations 1000 that may be performed by a first type of UE to communicate with a base station (e.g., with a base station performing operations described above with reference to FIG. 9), according to aspects of the present disclosure.

Operations 1000 may begin at 1002, where the UE receives an allocation of uplink resources for communications with a base station on a first frequency band that is narrower than a second frequency band used by a second type of UE to communicate with the base station. The allocated uplink resources may be allocated in a narrowband subframe structure with an increased symbol duration and narrower subcarrier spacing relative to uplink resources allocated to the second type of UE. The narrowband subframe structure may comprise at least two time slots, and each time slot may have a same duration as a subframe structure used to communicate with the second type of UE. At 1004, the UE performs uplink transmissions on the allocated resources.

Figure 11:
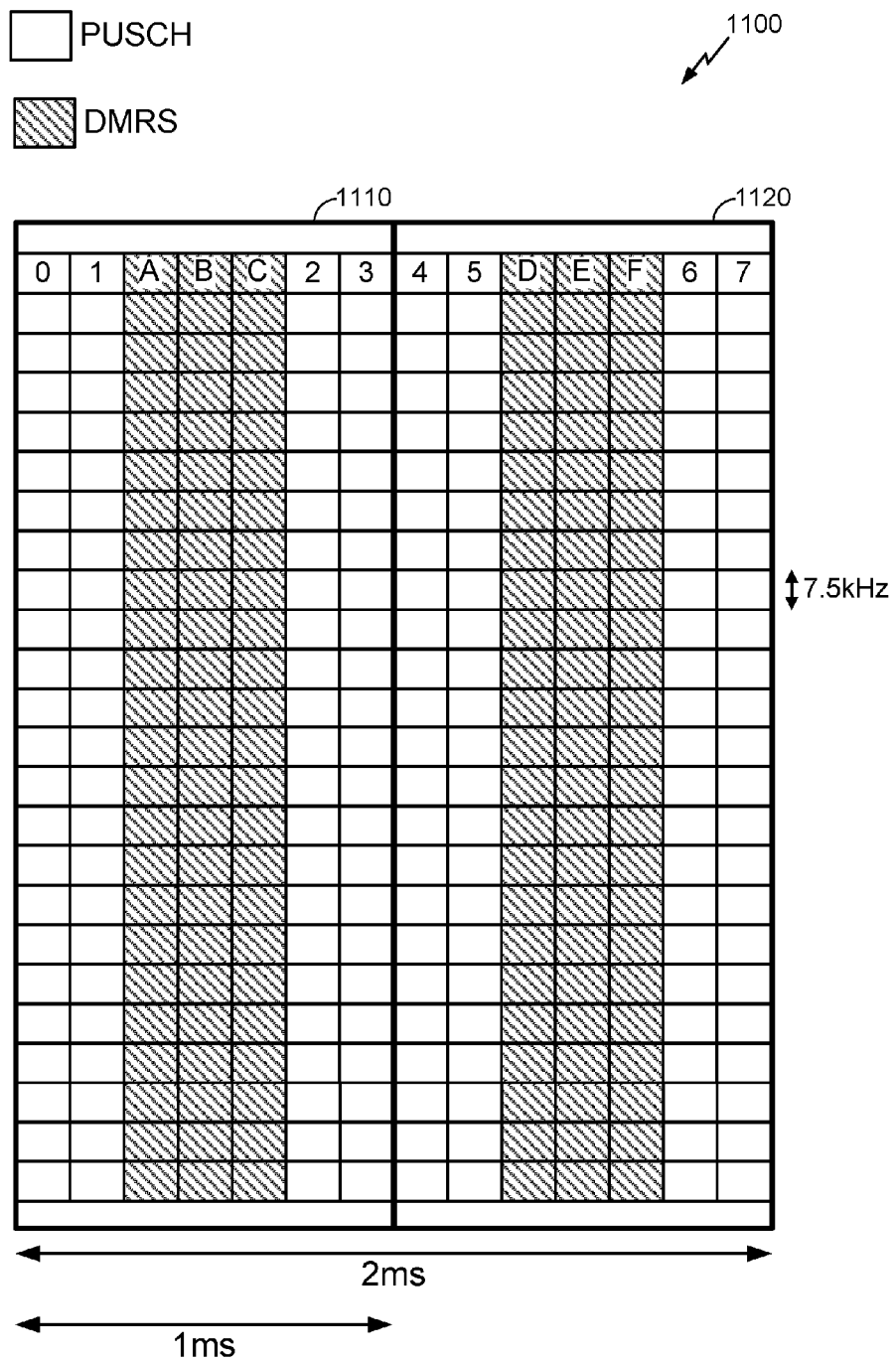
FIG. 11 illustrates an example narrowband subframe structure, in accordance with certain aspects of the present disclosure.

FIG. 11 illustrates an example subframe structure 1100 in which a narrowband subframe structure has an increased symbol duration and narrower subcarrier spacing relative to a wideband subframe, according to aspects of the present disclosure. As illustrated, the OFDM symbol length is multiplied by a factor of 2, and the subcarrier spacing is reduced by a factor of 2 relative to a wideband subframe. For example, each narrowband RB may have 24 subcarriers with a subcarrier spacing of 7.5 kHz (as opposed to a wideband RB having 12 subcarriers with a subcarrier spacing of 15 kHz). The cyclic prefix length in a narrowband structure is twice the length of a cyclic prefix used in a wideband structure. Finally, the length of the subframe is increased to 2 milliseconds in duration, with each slot 1110 and 1120 being 1 millisecond in duration. Alternatively, a narrowband subframe structure can be defined with a duration of 1 millisecond and a reduced number of OFDM symbols relative to a wideband subframe structure. For example, a narrowband subframe structure with a duration of 1 millisecond may have 7 OFDM symbols (e.g., half the number of symbols of a wideband subframe structure).

Figure 12:
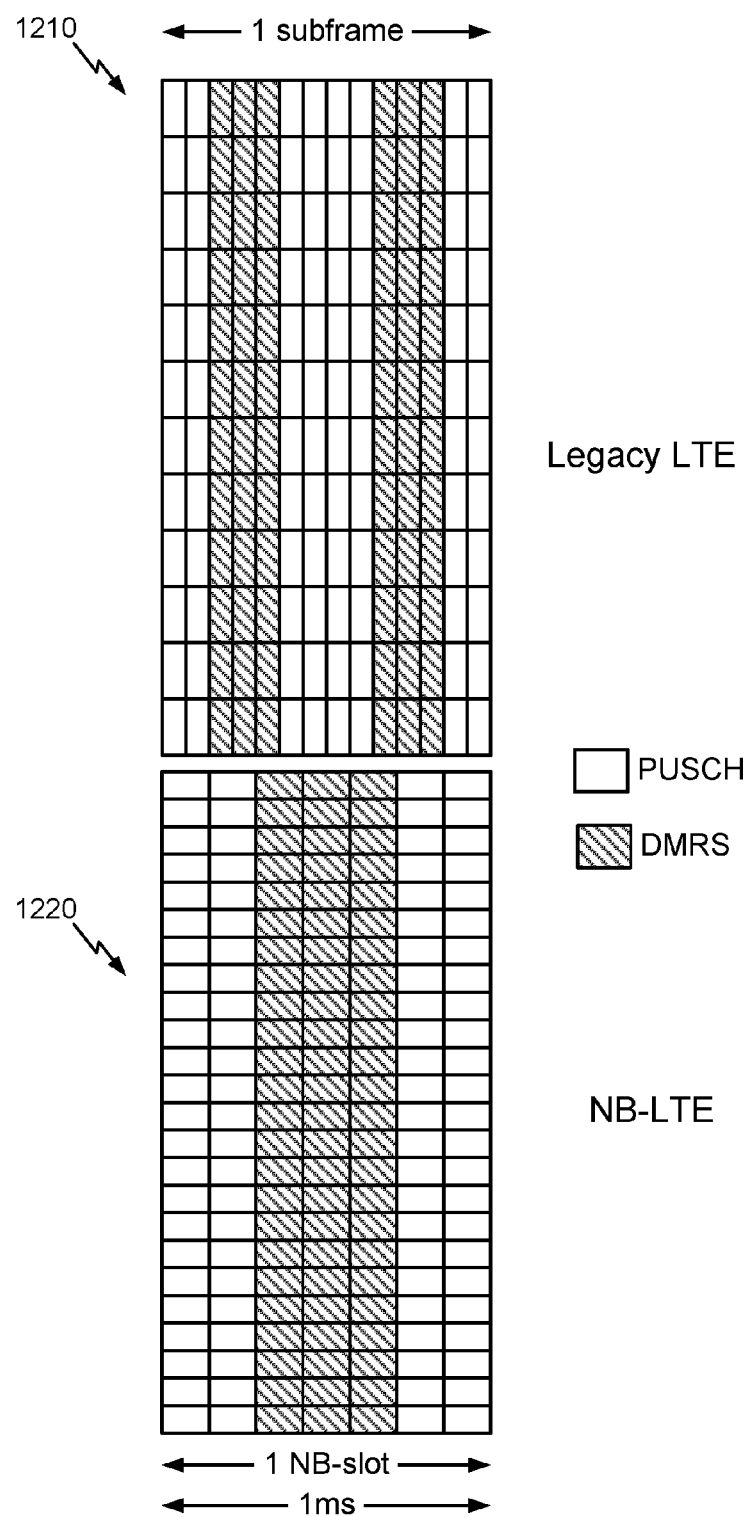
FIG. 12 illustrates a comparison between a narrowband subframe structure and a legacy (wideband) subframe structure, in accordance with certain aspects of the present disclosure.

FIG. 12 illustrates a comparison between a wideband (legacy) subframe 1210 and a narrowband slot 1220, according to aspects of the present disclosure. As illustrated, a single narrowband slot 1220 has the same duration as a wideband subframe 1210 (i.e. both are 1 millisecond in duration). Alternatively, a narrowband subframe could be defined with a duration of 1 millisecond, as described above.

The scheduling unit may be 1 resource element during 1 narrowband slot. Efficient TDD operation with one slot transmissions may be enabled. For example, if only one uplink subframe is available, the eNB may grant a narrowband UE a single narrowband slot, so that the UE is aligned with wideband LTE UEs.

By using an extended OFDM symbol length and narrower subcarrier spacing for narrowband LTE communications relative to wideband LTE communications, the cyclic prefix length may be increased while keeping the same overhead for narrowband LTE communications and wideband LTE communications. Since 1 narrowband slot has the same duration as 1 wideband subframe, TDD and slot-level scheduling may be used. However, there may be a loss of orthogonality between narrowband LTE communications and wideband LTE communications. Further, multiplying the cyclic prefix length by a factor of 2 may not provide enough of a cushion to account for timing errors.

In some cases (hereinafter "scheme 4"), narrowband LTE transmissions may use a different numerology that is compatible with wideband LTE timing. By using a different numerology that is compatible with wideband LTE timing, OFDM symbols (or OFDM symbols with a guardband) may be aligned with slot and/or subframe boundaries. Such alignment may aid in performing time domain duplexed communications with narrowband UEs and wideband UEs.

Figure 13:
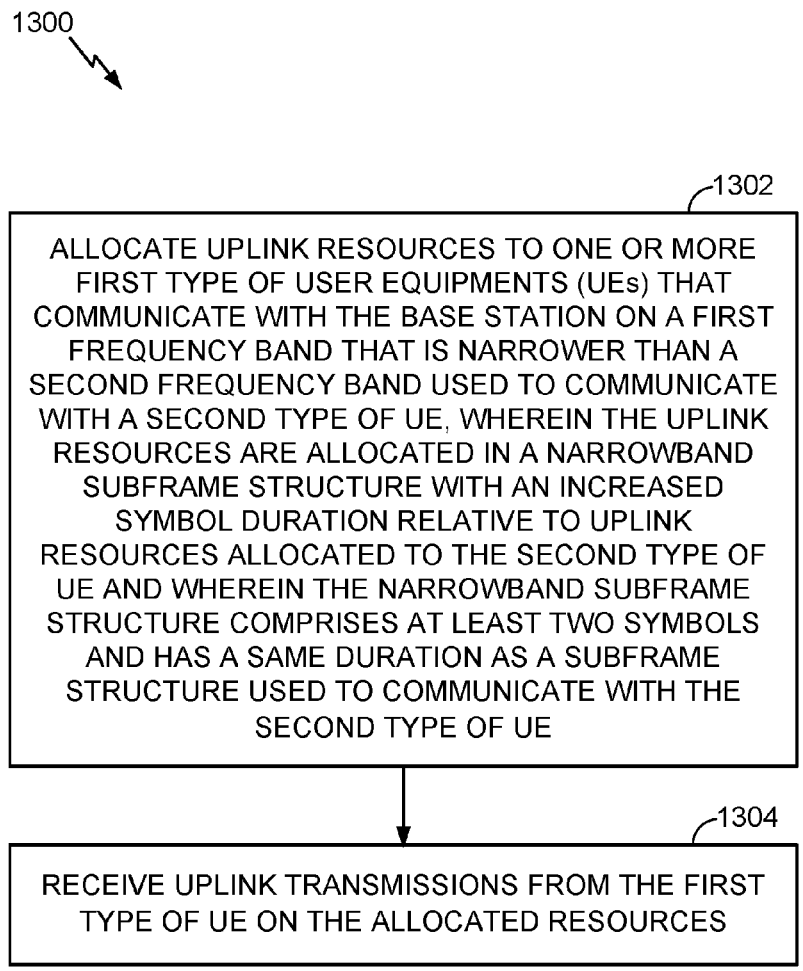
FIG. 13 illustrates example operations that may be performed by a base station to communicate with UEs on a narrow frequency band relative to a second frequency band, in accordance with certain aspects of the present disclosure.

FIG. 13 illustrates example operations 1300 that may be performed by a base station to allocate uplink resources (according to "scheme 4") to a first type of UE (e.g., a narrowband UE), according to aspects of the present disclosure.

Operations 1300 may begin at 1302, where the base station allocates uplink resources to one or more first type of user equipments (UEs) that communicate with the base station on a first frequency band that is narrower than a second frequency band used to communicate with a second type of UE. The uplink resources are allocated in a narrowband subframe structure with an increased symbol duration relative to uplink resources allocated to the second type of UE. The narrowband subframe structure may comprise at least two symbols and have a same duration as a subframe structure used to communicate with the second type of UE. At 1304, the base station receives uplink transmissions from the first type of UE on the allocated resources.

Figure 14:
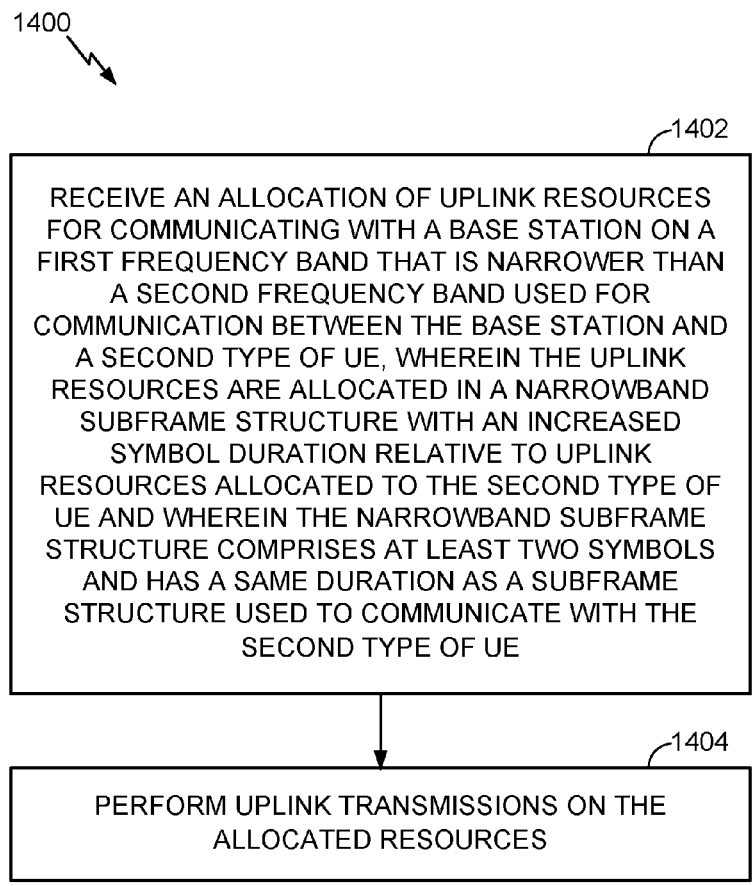
FIG. 14 illustrates example operations that may be performed by a user equipment (UE) to communicate with a base station on a narrow frequency band relative to a second frequency band, in accordance with certain aspects of the present disclosure.

FIG. 14 illustrates example operations 1400 that may be performed by a first type of UE to communicate with a base station (e.g., a base station performing operations described above with reference to FIG. 13), according to aspects of the present disclosure.

Operations 1400 may begin at 1402, where the UE receives an allocation of uplink resources for communications with a base station on a first frequency band that is narrower than a second frequency band used by a second type of UE to communicate with the base station. The uplink resources are allocated in a narrowband subframe structure with an increased symbol duration relative to uplink resources allocated to the second type of UE. The narrowband subframe structure may comprise at least two symbols and have a same duration as a subframe structure used to communicate with the second type of UE. At 1404, the UE performs uplink transmissions on the allocated resources.

FIG. 15A illustrates a wideband LTE subframe/slot structure 1510, according to some embodiments. With 7 symbols per slot and a sampling frequency of 1.92 MHz, a slot may comprise 960 time samples, and a subframe may comprise 1920 time samples. Each slot may include a cyclic prefix with a length of 9 or 10 time samples and data with a length of 128 time samples, for a total of 64 time samples used for cyclic prefixes and 896 time samples used for data.

In some cases, the subframe numerology (e.g., according to "scheme 4") may be multiplied by a factor of 7. By multiplying the subframe numerology by 7, one narrowband OFDM symbol may correspond in duration to one wideband slot. As illustrated by narrowband subframe structure 1520 in FIG. 15B, each symbol may have a cyclic prefix with a duration of 64 time samples and a data portion with a duration of 896 time samples, for a total of 960 time samples per symbol. Thus, each narrowband symbol may be aligned with a wideband slot.

In some cases, the subframe numerology may be multiplied by a factor of 6. If the numerology is multiplied by a factor, there may be approximately 7/6 of a symbol per wideband LTE slot. In one case, as illustrated in FIG. 16A, a large cyclic prefix may be used to align narrowband symbol boundaries to wideband slot boundaries. A narrowband subframe 1610 may include two OFDM symbols, each having a cyclic prefix with a duration of 192 time samples and a data portion of 768 time samples (which results in a symbol duration of 960 time samples, or the duration of a single wideband slot). Additionally, this numerology can be obtained by extending the legacy LTE extended CP waveform by a factor of 6.

In another example, a guard period may be introduced. As illustrated by narrowband subframe structure 1530 in FIG. 15C, each symbol may have a cyclic prefix with a duration of 44 time samples and a data portion with a duration of 896 time samples. In one case, a guard period with a duration of 40 time samples may be added at the end of a second symbol, such that a boundary of a narrowband subframe is aligned with a boundary of a wideband subframe. In another case, a guard period may be added to the end of each narrowband symbol (e.g., a symbol may have a cyclic prefix with a duration of 44 time samples, a data portion with a duration of 896 time samples, and a guard period of 20 time samples). The boundary of each narrowband symbol may be aligned with the boundary of a wideband slot, and the boundary of each narrowband subframe may be aligned with the boundary of a wideband subframe.

In some cases, to align narrowband symbols using a spreading factor of 6, a guard period may be added such that narrowband transmissions avoid interfering with wideband SRS transmissions and/or legacy LTE transmissions that are time-multiplexed in the same RB. FIG. 16B illustrates the use of a symmetric guard period to provide for slot boundary alignment. As illustrated, a narrowband subframe 1620 may include two OFDM symbols, and each OFDM symbol may include a cyclic prefix with a duration of 106 time samples, a data portion with a duration of 768 time samples, and a guard period with a duration of 86 time samples. In another case, as illustrated in FIG. 16C, an asymmetric guard period may be used in a narrowband subframe 1630 to leave the last OFDM symbol in a wideband subframe structure empty for wideband (legacy) SRS transmission. As illustrated, each symbol may have a cyclic prefix with a duration of 96 time samples and a data portion of 768 time samples. After the second symbol is transmitted, a guard period with a duration of 192 time samples (i.e., ⅕ the size of a wideband slot) may be used to avoid interfering with a wideband (legacy) SRS. In some cases, the choice of which uplink numerology to use for narrowband transmissions may depend on the characteristics of the wideband deployment.

Figure 17:
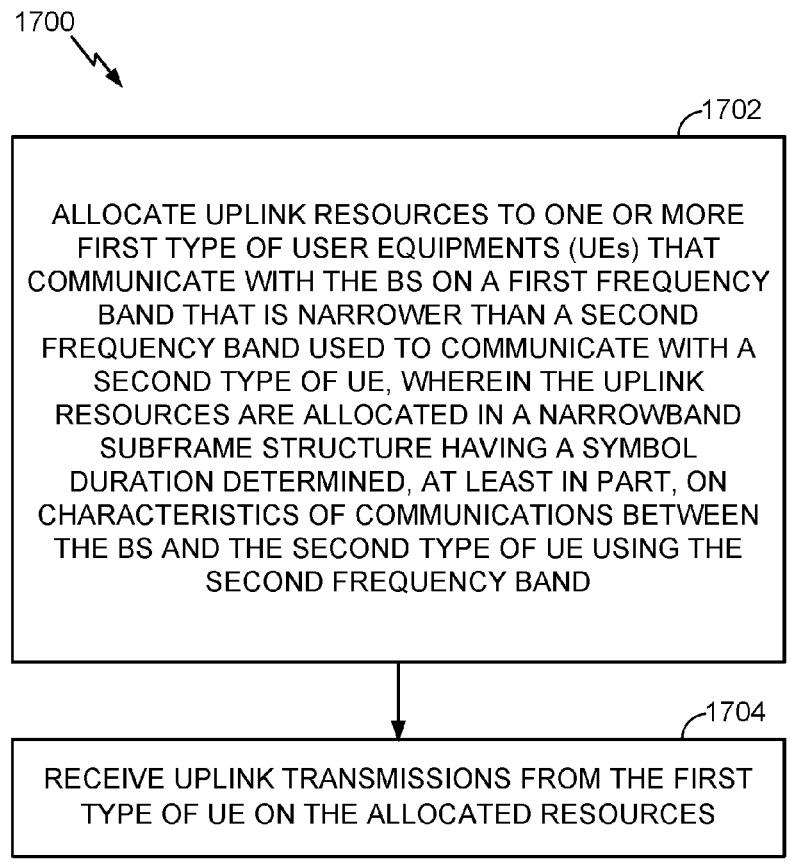
FIG. 17 illustrates example operations that may be performed by a base station to communicate with UEs on a narrow frequency band relative to a second frequency band, in accordance with certain aspects of the present disclosure.

FIG. 17 illustrates example operations 1700 that may be performed by a base station to allocate resources to a first type of UE (e.g., a narrowband UE) based on characteristics of communications on a wideband, according to aspects of the present disclosure. Operations 1700 may begin at 1702, where the base station allocates uplink resources to one or more first type of user equipments (UEs) that communicate with the base station on a first frequency band that is narrower than a second frequency band used to communicate with a second type of UE. The uplink resources are allocated in a narrowband subframe structure having a symbol duration determined, at least in part, on characteristics of communications between the base station and the second type of UE using the second frequency band. At 1704, the base station receives uplink transmissions from the first type of UE on the allocated resources.

Figure 18:
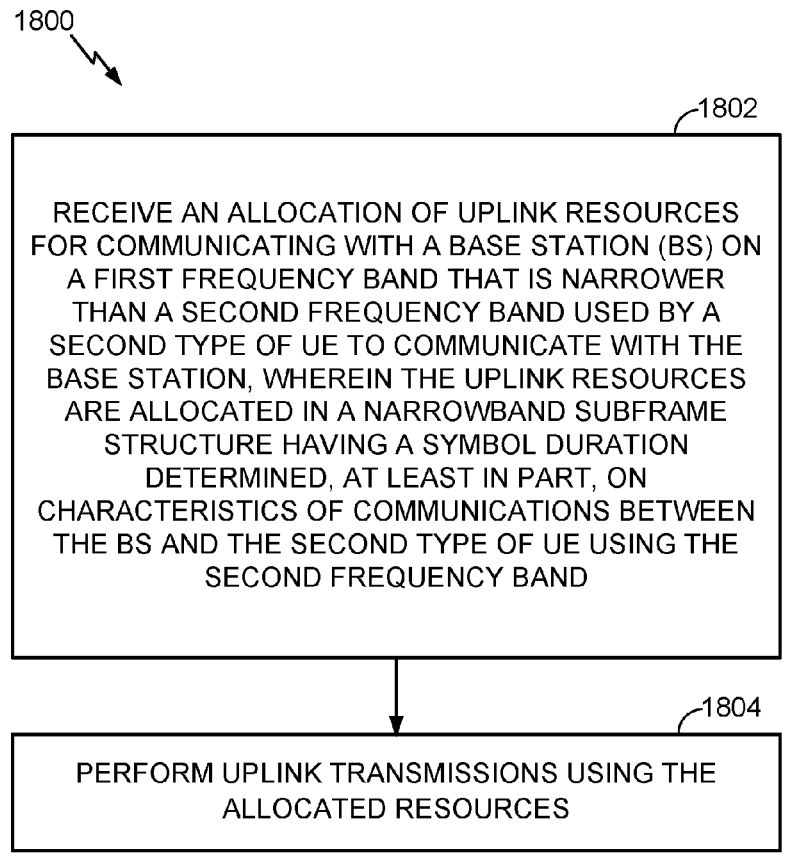
FIG. 18 illustrates example operations that may be performed by a user equipment (UE) to communicate with a base station on a narrow frequency band relative to a second frequency band, in accordance with certain aspects of the present disclosure.

FIG. 18 illustrates example operations 1800 that may be performed by a first type of UE to communicate with a base station, according to aspects of the present disclosure. Operations 1800 may begin at 1802, where the UE receives an allocation of uplink resources for communications with a base station on a first frequency band that is narrower than a second frequency band used by a second type of UE to communicate with the base station. The uplink resources are allocated in a narrowband subframe structure having a symbol duration determined, at least in part, on characteristics of communications between the base station and the second type of UE using the second frequency band. At 1804, the UE performs uplink transmissions using the allocated resources.

FIG. 19 illustrates an example 1900 of relationships between characteristics of communications between the base station and the second type of UE (e.g., a wideband UE) and a choice of uplink numerology to be used for narrowband communications, according to aspects of the present disclosure. As illustrated, if wideband communications use a normal cyclic prefix and TDD, narrowband communications may be performed according to scheme 2, as described above. If wideband communications use a normal cyclic prefix and FDD, however, narrowband communications may be performed according to scheme 1, as described above. Finally, if wideband communications use an extended cyclic prefix, scheme 3 may be used regardless of whether or not the wideband communications are performed using TDD or FDD.

In some cases, the narrowband frame structure may also be chosen based on whether or not SRS is present in certain wideband subframes. If SRS is present, for example, the narrowband communications may use scheme 4 with a guard period and a spreading factor of 6. If SRS is not present, the narrowband communications may use scheme 4 with a small guard period and a spreading factor of 7.

In some cases, the narrowband frame structure may also be selected based on whether the narrowband deployment is in-band, standalone or in a guardband. If a standalone deployment is used for narrowband communications, for example, a numerology that is not compatible with legacy LTE may be used (e.g., with symbols that are not aligned with subframe boundaries).

Figure 20:
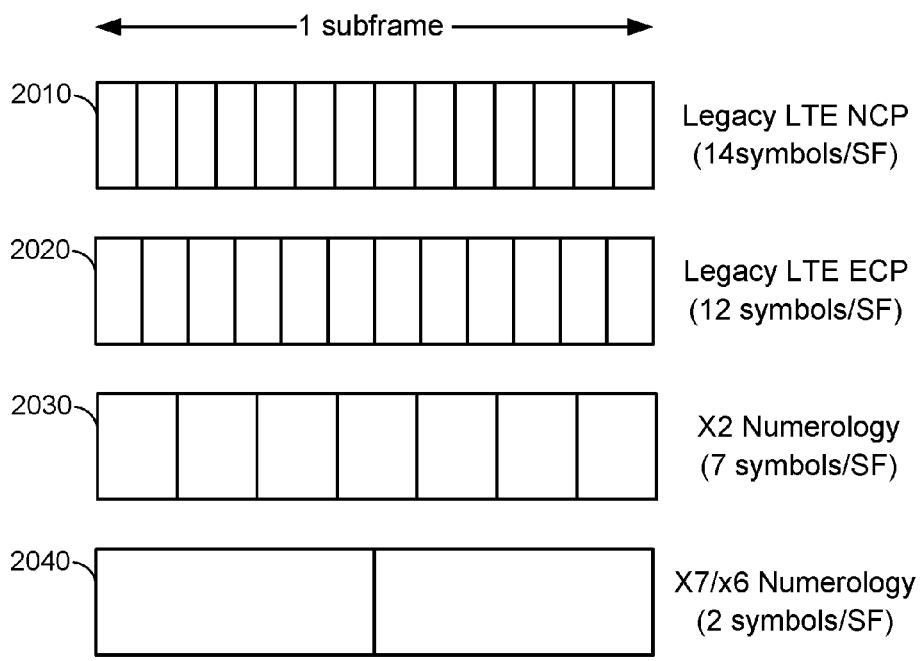
FIG. 20 illustrates various subframe structures having a duration of a wideband subframe, in accordance with certain aspects of the present disclosure.

In some cases, as illustrated in FIG. 20, each of the schemes described above may use a subframe structure with a duration of 1 ms. For scheme 1 or scheme 3, where a 1 millisecond subframe structure is used, the subframe may include 14 symbols (if a normal cyclic prefix is used, as illustrated by subframe 2010) or 12 symbols (if an extended cyclic prefix is used, as illustrated by subframe 2020). For scheme 3, where the OFDM symbol length is increased and the subcarrier spacing is decreased by a corresponding amount, a 1 millisecond subframe 2030 may include 7 symbols (i.e., half the number of symbols of a wideband subframe structure using a normal cyclic prefix). Finally, for scheme 4, a 1 millisecond subframe 2040 structure may include 2 symbols, and as described above, optionally include a guard period for rate matching around wideband SRS or wideband (legacy) transmissions that are time-multiplexed in the same RB.

In some cases, if wideband communications use TDD, the uplink numerology used by narrowband UEs to communicate with a base station may be based on the number of uplink subframes in a frame. For example, if wideband communications are performed using TDD configuration 0 (which has 6 uplink subframes in a frame), the uplink numerology used by narrowband UEs may be multiplied by 6 (as described above); meanwhile, if wideband communications are performed using TDD configuration 1 (which has 4 uplink subframes in a frame), the uplink numerology used by narrowband UEs may be multiplied by 4. In some cases, the uplink numerology used for narrowband communications may be adjusted based on the availability of uplink subframes in a frame. For example, in TDD configuration 6, the first half of the frame includes 3 uplink subframes, while the second half of the frame includes 2 uplink subframes. Narrowband UEs may use an uplink numerology multiplied by 6 for the first half of the frame, while the uplink numerology may be multiplied by 4 for the second half of the frame.

In some cases, the uplink numerology used for communications with the eNodeB may be signaled explicitly to narrowband UEs by the eNodeB. The uplink numerology may be broadcast (e.g., in a system information block) or transmitted to narrowband UEs individually (e.g., in RRC connection messages). In some cases, the uplink numerology may be transmitted in the uplink grant.

In some cases (hereinafter "scheme 5"), narrowband LTE transmissions may use an uplink numerology that is not compatible with wideband LTE timing. Symbols in a narrowband LTE subframe structure may align with a boundary of a set of wideband LTE subframes.

Figure 21:
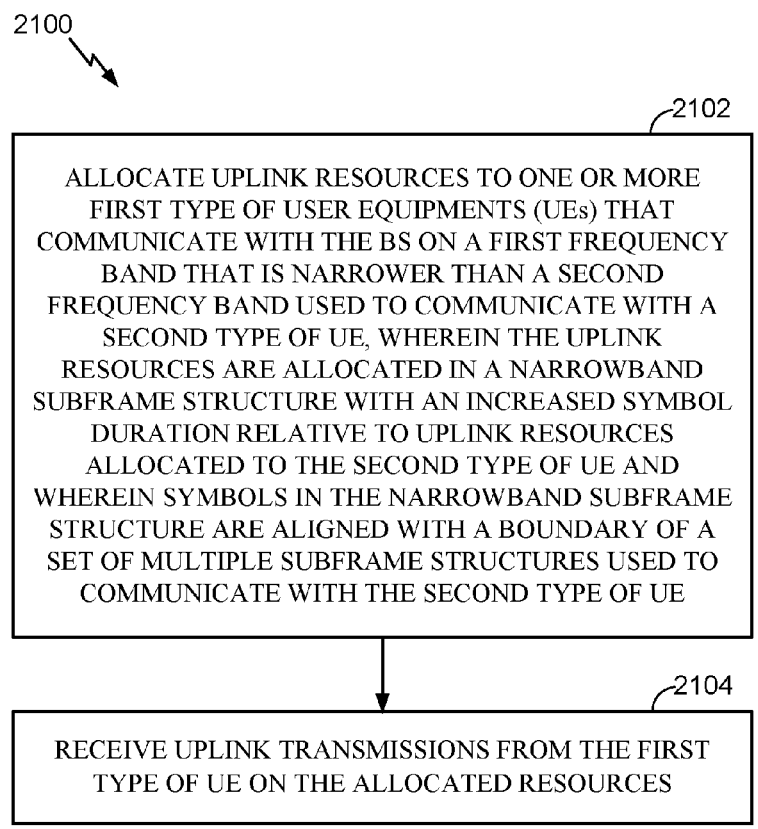
FIG. 21 illustrates example operations that may be performed by a base station to communicate with UEs on a narrow frequency band relative to a second frequency band, in accordance with certain aspects of the present disclosure.

FIG. 21 illustrates example operations that may be performed by a base station to allocate resources (according to "scheme 5") to a first type of UE (e.g., a narrowband UE), according to aspects of the present disclosure.

Operations 2100 begin at 2102, where the base station allocates uplink resources to one or more first type of user equipments (UEs) that communicate with the base station on a first frequency band that is narrower than a second frequency band used to communicate with a second type of UE. The uplink resources are allocated in a narrowband subframe structure with an increased symbol duration relative to uplink resources allocated to the second type of UE. Symbols in the narrowband subframe structure may be aligned with a boundary of a set of multiple subframe structures used to communicate with the second type of UE.

At 2104, the base station receives uplink transmissions from the first type of UE on the allocated resources.

Figure 22:
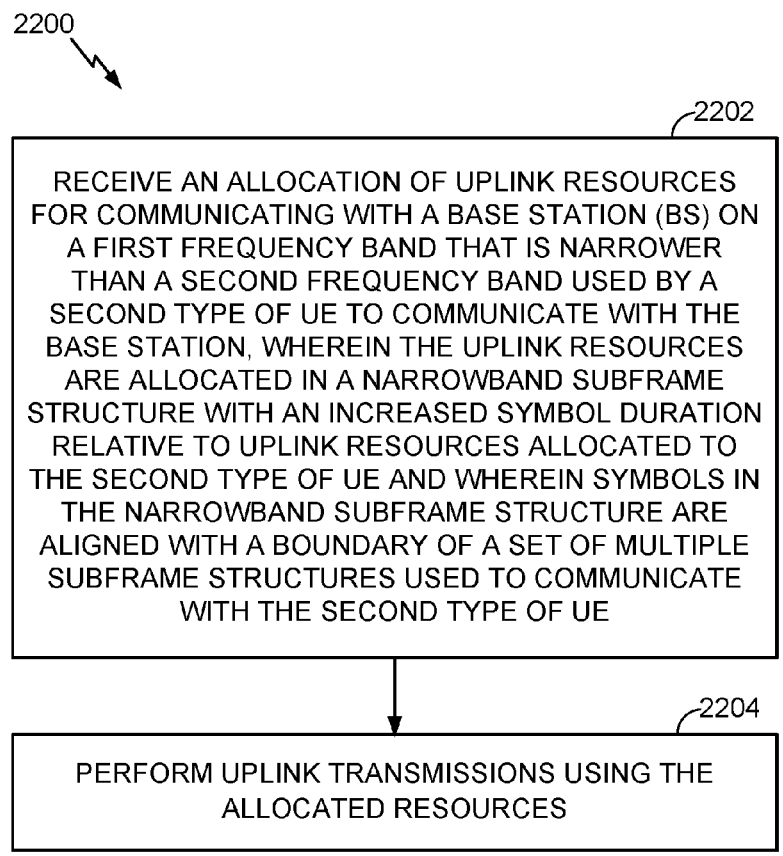
FIG. 22 illustrates example operations that may be performed by a user equipment (UE) to communicate with a base station on a narrow frequency band relative to a second frequency band, in accordance with certain aspects of the present disclosure.

FIG. 22 illustrates example operations that may be performed by a first type of UE to communicate with a base station (e.g., a base station performing operations described above with reference to FIG. 21), according to aspects of the present disclosure.

Operations 2200 may begin at 2202, where the UE receives an allocation of uplink resources for communications with a base station on a first frequency band that is narrower than a second frequency band used by a second type of UE to communicate with the base station. The uplink resources are allocated in a narrowband subframe structure with an increased symbol duration relative to uplink resources allocated to the second type of UE. Symbols in the narrowband subframe structure may be aligned with a boundary of a set of multiple subframe structures used to communicate with the second type of UE. At 2204, the UE performs uplink transmissions on the allocated resources.

In scheme 5, OFDM symbols (or OFDM symbols plus an additional guard period) used in the narrowband structure may be aligned with a subframe boundary or a boundary of a set of multiple subframes used in a wideband structure. In some cases, guard periods or cyclic prefix samples may be added to align the beginning of an OFDM symbol used in the narrowband structure with a subframe boundary or boundary of a set of multiple subframes used in the wideband structure.

For example, an uplink numerology for a narrowband subframe structure may be multiplied by 4, resulting in a 4 ms subframe duration, a 2 ms slot duration, and a symbol duration that is four times the duration of a symbol used in a wideband subframe structure. While boundaries of narrowband subframes may not align with boundaries of wideband subframes, OFDM symbols used in the narrowband structure may be aligned with OFDM symbols used in the wideband structure every other wideband subframe (e.g., OFDM symbols used in the narrowband and wideband structures may be aligned when communications are started [time 0], at 2 ms (after 2 wideband subframes and the first slot of the first narrowband subframe have been transmitted), at 4 ms (after 4 wideband subframes and one narrowband subframe have been transmitted), and so on.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a base station (BS), comprising:
    allocating uplink resources to one or more first type of user equipments (UEs) that communicate with the BS on a first frequency band that is narrower than a second frequency band used to communicate with a second type of UE, wherein:
        the uplink resources are allocated in a narrowband subframe structure with an increased symbol duration relative to uplink resources allocated to the second type of UE, symbols in the narrowband subframe structure are aligned with a boundary of a set of multiple subframes used to communicate with the second type of UE, and the narrowband subframe structure comprises a guard period distinct from cyclic prefixes associated with the symbols in the narrowband subframe structure to align a boundary of the narrowband subframe structure with the boundary of the set of multiple subframes used to communicate with the second type of UE; and receiving uplink transmissions from the first type of UE on the allocated uplink resources.

2. The method of claim 1, wherein the increased symbol duration comprises a symbol duration that is four times the duration of a symbol duration allocated to the second type of UE.

3. The method of claim 1, wherein the first frequency band and second frequency band do not overlap.

4. The method of claim 1, wherein the first frequency band at least partially overlaps with a guardband portion of the second frequency band.

5. A method for wireless communications by a first type of user equipment (UE), comprising:
receiving an allocation of uplink resources for communicating with a base station (BS) on a first frequency band that is narrower than a second frequency band used to communicate with a second type of UE, wherein:
the uplink resources are allocated in a narrowband subframe structure with an increased symbol duration relative to uplink resources allocated to the second type of UE,
symbols in the narrowband subframe structure are aligned with a boundary of a set of multiple subframes used to communicate with the second type of UE, and
the narrowband subframe structure comprises a guard period distinct from cyclic prefixes associated with the symbols in the narrowband subframe structure to align a boundary of the narrowband subframe structure with the boundary of the set of multiple subframes used to communicate with the second type of UE; and
performing uplink transmissions using the allocated uplink resources.

6. The method of claim 5, wherein the increased symbol duration comprises a symbol duration that is four times the duration of a symbol duration allocated to the second type of UE.

7. The method of claim 5, wherein the first frequency band and second frequency band do not overlap.

8. The method of claim 5, wherein the first frequency band at least partially overlaps with a guardband portion of the second frequency band.

9. An apparatus for wireless communications by a base station (BS), comprising:
a processor configured to:
allocate uplink resources to one or more first type of user equipments (UEs) that communicate with the BS on a first frequency band that is narrower than a second frequency band used to communicate with a second type of UE, wherein:
the uplink resources are allocated in a narrowband subframe structure with an increased symbol duration relative to uplink resources allocated to the second type of UE,
symbols in the narrowband subframe structure are aligned with a boundary of a set of multiple subframes used to communicate with the second type of UE, and
the narrowband subframe structure further comprises a guard period distinct from cyclic prefixes associated with the symbols in the narrowband subframe structure to align a boundary of the narrowband subframe structure with the boundary of the set of multiple subframes used to communicate with the second type of UE, and
receive uplink transmissions from the first type of UE on the allocated uplink resources; and
a memory couple to the processor.

10. The apparatus of claim 9, wherein the increased symbol duration comprises a symbol duration that is four times the duration of a symbol duration allocated to the second type of UE.

11. The apparatus of claim 9, wherein the first frequency band and second frequency band do not overlap.

12. The apparatus of claim 9, wherein the first frequency band at least partially overlaps with a guardband portion of the second frequency band.

13. An apparatus for wireless communications by a first type of user equipment (UE), comprising:
a processor configured to:
receive an allocation of uplink resources for communicating with a base station (BS) on a first frequency band that is narrower than a second frequency band used to communicate with a second type of UE, wherein:
the uplink resources are allocated in a narrowband subframe structure with an increased symbol duration relative to uplink resources allocated to the second type of UE,
symbols in the narrowband subframe structure are aligned with a boundary of a set of multiple subframes used to communicate with the second type of UE, and
the narrowband subframe structure further comprises a guard period distinct from cyclic prefixes associated with the symbols in the narrowband subframe structure to align a boundary of the narrowband subframe structure with the boundary of the set of multiple subframes used to communicate with the second type of UE, and
perform uplink transmissions using the allocated uplink resources; and
a memory coupled to the processor.

14. The apparatus of claim 13, wherein the increased symbol duration comprises a symbol duration that is four times the duration of a symbol duration allocated to the second type of UE.

15. The apparatus of claim 13, wherein the first frequency band and second frequency band do not overlap.

16. The apparatus of claim 13, wherein the first frequency band at least partially overlaps with a guardband portion of the second frequency band.

17. An apparatus for wireless communications by a base station (BS), comprising:
means for allocating uplink resources to one or more first type of user equipments (UEs) that communicate with the BS on a first frequency band that is narrower than a second frequency band used to communicate with a second type of UE, wherein:

the uplink resources are allocated in a narrowband subframe structure with an increased symbol duration relative to uplink resources allocated to the second type of UE, symbols in the narrowband subframe structure are aligned with a boundary of a set of multiple subframes used to communicate with the second type of UE, and the narrowband subframe structure further comprises a guard period distinct from cyclic prefixes associated with the symbols in the narrowband subframe structure to align a boundary of the narrowband subframe structure with the boundary of the set of multiple subframes used to communicate with the second type of UE; and means for receiving uplink transmissions from the first type of UE on the allocated uplink resources.

18. The apparatus of claim 17, wherein the increased symbol duration comprises a symbol duration that is four times the duration of a symbol duration allocated to the second type of UE.

19. The apparatus of claim 17, wherein the first frequency band and second frequency band do not overlap.

20. The apparatus of claim 17, wherein the first frequency band at least partially overlaps with a guardband portion of the second frequency band.

21. An apparatus for wireless communications by a first type of user equipment (UE), comprising:

means for receiving an allocation of uplink resources for communicating with a base station (BS) on a first frequency band that is narrower than a second frequency band used to communicate with a second type of UE, wherein:

the uplink resources are allocated in a narrowband subframe structure with an increased symbol duration relative to uplink resources allocated to the second type of UE, symbols in the narrowband subframe structure are aligned with a boundary of a set of multiple subframes used to communicate with the second type of UE, and the narrowband subframe structure further comprises a guard period distinct from cyclic prefixes associated with the symbols in the narrowband subframe structure to align a boundary of the narrowband subframe structure with the boundary of the set of multiple subframes used to communicate with the second type of UE; and means for performing uplink transmissions using the allocated uplink resources.

22. The apparatus of claim 21, wherein the increased symbol duration comprises a symbol duration that is four times the duration of a symbol duration allocated to the second type of UE.

23. The apparatus of claim 21, wherein the first frequency band and second frequency band do not overlap.

24. The apparatus of claim 21, wherein the first frequency band at least partially overlaps with a guardband portion of the second frequency band.

25. A non-transitory computer-readable medium comprising instructions which, when executed by a processor, performs an operation for wireless communications by a base station (BS), the operations comprising:

allocating uplink resources to one or more first type of user equipments (UEs) that communicate with the BS on a first frequency band that is narrower than a second frequency band used to communicate with a second type of UE, wherein:

the uplink resources are allocated in a narrowband subframe structure with an increased symbol duration relative to uplink resources allocated to the second type of UE, symbols in the narrowband subframe structure are aligned with a boundary of a set of multiple subframes used to communicate with the second type of UE, and the narrowband subframe structure further comprises a guard period distinct from cyclic prefixes associated with the symbols in the narrowband subframe structure to align a boundary of the narrowband subframe structure with the boundary of the set of multiple subframes used to communicate with the second type of UE; and receiving uplink transmissions from the first type of UE on the allocated uplink resources.

26. A non-transitory computer-readable medium comprising instructions which, when executed by a processor, performs an operation for wireless communications by a user equipment (UE), the operations comprising:

receiving an allocation of uplink resources for communicating with a base station (BS) on a first frequency band that is narrower than a second frequency band used to communicate with a second type of UE, wherein:

the uplink resources are allocated in a narrowband subframe structure with an increased symbol duration relative to uplink resources allocated to the second type of UE, symbols in the narrowband subframe structure are aligned with a boundary of a set of multiple subframes used to communicate with the second type of UE, and the narrowband subframe structure further comprises a guard period distinct from cyclic prefixes associated with the symbols in the narrowband subframe structure to align a boundary of the narrowband subframe structure with the boundary of the set of multiple subframes used to communicate with the second type of UE; and performing uplink transmissions using the allocated uplink resources.

* * * * *